United States Patent
McWhinney et al.

(10) Patent No.: US 10,400,341 B2
(45) Date of Patent: Sep. 3, 2019

(54) MEMBRANE MODULE MOLD

(71) Applicant: Christopher M. McWhinney, Dayton, OH (US)

(72) Inventors: Christopher M. McWhinney, Englewood, OH (US); David C. Erbaugh, Englewood, OH (US)

(73) Assignee: Christopher M. McWhinney, Englewood, OH (US)

( * ) Notice: Subject to any disclaimer, the term of this patent is extended or adjusted under 35 U.S.C. 154(b) by 0 days.

(21) Appl. No.: 15/422,569

(22) Filed: Feb. 2, 2017

(65) Prior Publication Data

US 2017/0145573 A1    May 25, 2017

Related U.S. Application Data

(60) Division of application No. 14/605,496, filed on Jan. 26, 2015, which is a continuation-in-part of
(Continued)

(51) Int. Cl.
*C25B 13/02* (2006.01)
*C25B 13/08* (2006.01)
(Continued)

(52) U.S. Cl.
CPC ........ *C25B 13/02* (2013.01); *B29C 45/14065* (2013.01); *C25B 1/10* (2013.01); *C25B 13/08* (2013.01); *C25B 15/02* (2013.01); *H01M 8/0656* (2013.01); *B29C 2045/14147* (2013.01); *B29K 2023/065* (2013.01);
(Continued)

(58) Field of Classification Search
CPC .. C25B 1/00; C25B 9/08; C25B 13/00; C25B 13/02; C25B 13/04; C25B 13/06; C25B 13/08; C25B 15/02; C25B 1/10; H01M 8/0293; Y10T 29/49117; Y02P 20/133; Y02P 20/134; Y02P 70/56; Y02E 60/366; Y02E 60/50
See application file for complete search history.

(56) References Cited

U.S. PATENT DOCUMENTS

| | | | | |
|---|---|---|---|---|
| 4,175,025 A | * | 11/1979 | Creamer | C25B 9/20 204/253 |
| 2004/0040838 A1 | * | 3/2004 | Helmke | C25B 1/12 204/275.1 |

(Continued)

*Primary Examiner* — Ciel P Thomas
(74) *Attorney, Agent, or Firm* — The Richards Law Firm LLC; William B. Richards, Esq.

(57) ABSTRACT

A membrane module and method of making are provided, including a mold therefor. Exemplarily, the module, which comprises a membrane around which is formed a frame, is adapted for use with an electrochemical apparatus. The membrane comprises a fabric made from a synthetic fiber such as nylon, where the nylon is woven into ripstop nylon fabric. The frame, which comprises, exemplarily, high-density polyethylene (HDPE) or polypropylene, includes a wedge-shaped portion to facilitate collection of evolved gases and which provides support to the membrane as well as support to internal electrodes. The mold is adapted to suspend and secure the membrane during formation of the module and to provide a module which secures the membrane within the frame after formation of the module.

5 Claims, 13 Drawing Sheets

Related U.S. Application Data application No. 13/894,734, filed on May 15, 2013, now Pat. No. 8,940,152, which is a continuation of application No. 12/421,782, filed on Apr. 10, 2009, now Pat. No. 8,465,629.

(60) Provisional application No. 61/044,336, filed on Apr. 11, 2008.

(51) Int. Cl.
| | |
|---|---|
| *C25B 15/02* | (2006.01) |
| *C25B 1/10* | (2006.01) |
| *H01M 8/0656* | (2016.01) |
| *B29C 45/14* | (2006.01) |
| B29K 23/00 | (2006.01) |
| B29L 31/00 | (2006.01) |

(52) U.S. Cl.
CPC ....... *B29L 2031/755* (2013.01); *Y02E 60/366* (2013.01); *Y02E 60/50* (2013.01); *Y02P 20/133* (2015.11); *Y02P 20/134* (2015.11); *Y02P 70/56* (2015.11); *Y10T 29/49117* (2015.01)

(56) References Cited

U.S. PATENT DOCUMENTS

2007/0184327 A1\* 8/2007 Ishioka ............... H01M 8/0273
429/457
2010/0086829 A1\* 4/2010 Ridley ................ H01M 8/0273
429/498

\* cited by examiner

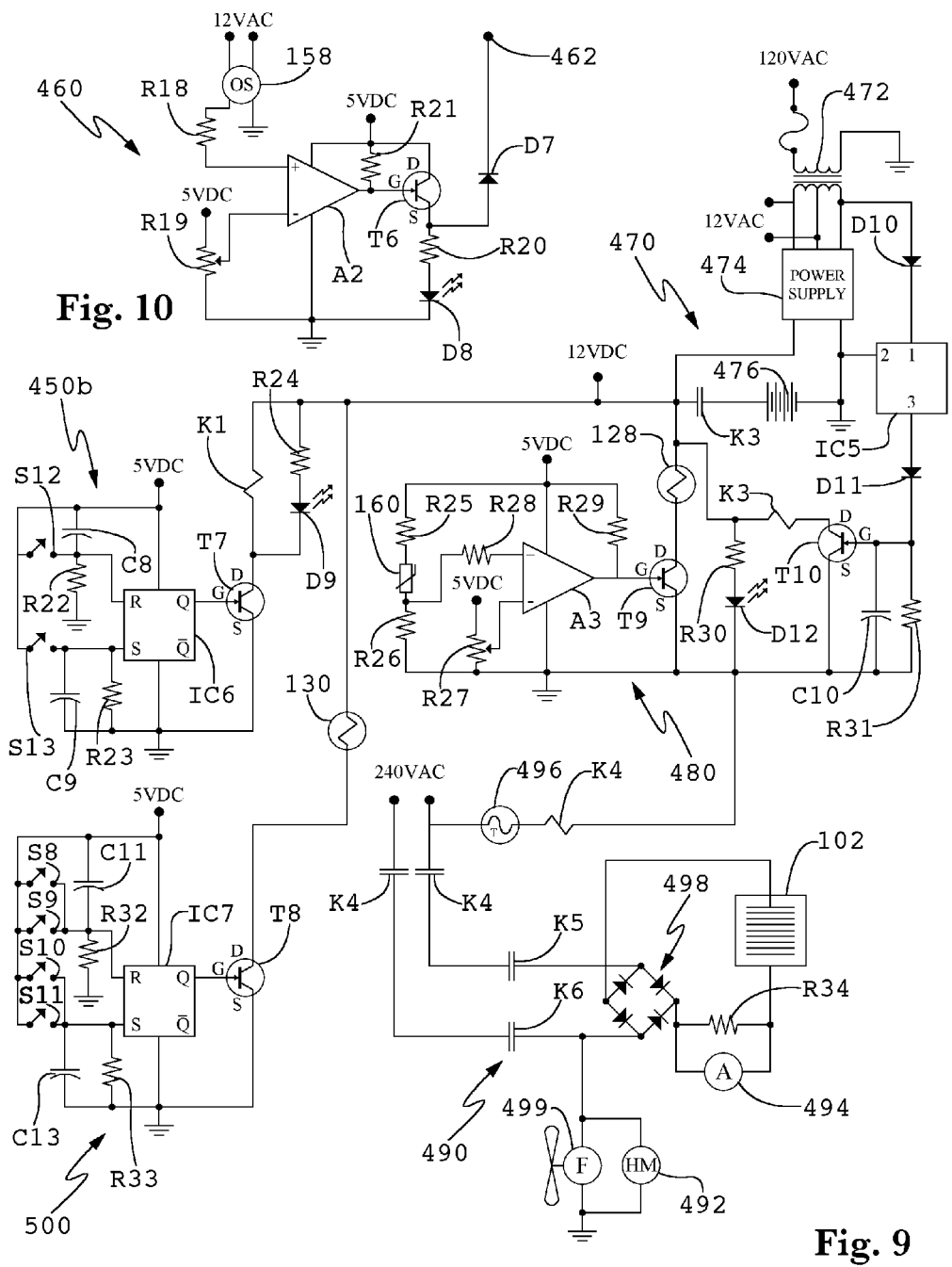

MEMBRANE MODULE MOLD

CROSS-REFERENCES TO RELATED APPLICATIONS

This application is a divisional application of, and claims priority to, U.S. application Ser. No. 14/605,496, filed Jan. 26, 2015, entitled "Membrane Module", currently pending, which U.S. application Ser. No. 14/605,496 is a continuation-in-part of, and claims priority to, U.S. application Ser. No. 13/894,734, filed May 15, 2013, entitled "Electrochemical Process", now U.S. Pat. No. 8,940,152, issued Jan. 27, 2015, which U.S. application Ser. No. 13/894,734 is a continuation of, and claims priority to, U.S. application Ser. No. 12/421,782, filed Apr. 10, 2009, entitled "Membrane for Electrochemical Apparatus", now U.S. Pat. No. 8,465,629, issued Jun. 18, 2013, which U.S. patent application Ser. No. 12/421,782 is a non-provisional application of, and claims priority to, U.S. Prov. Pat. App. No. 61/044,336, filed Apr. 11, 2008, entitled "Hydrogen Generation Process", which applications are incorporated herein by reference.

TECHNICAL FIELD

This description relates to electrochemical systems, particularly hydrogen generation systems and, more particularly, to the electrolysis of water to produce hydrogen.

BACKGROUND

Hydrogen can provide clean energy for powering automobiles as well as for cooking, space heating, heating hot water, and supplying power to absorption air conditioning and refrigeration units. In addition, unlike conventional electricity, it may be stored for later use. As currently envisioned, widespread use of hydrogen will require a significant infrastructure for the efficient distribution and use of this fuel. Costs of hydrogen generation may also be a factor in its widespread use.

Hydrogen may be produced by the electrolysis of water, a readily available and inexpensive feedstock, by passing an electric current through the water. A source of direct current electricity is connected to an anode and a cathode placed in contact with the water and hydrogen is generated at the cathode and oxygen is generated at the anode. A membrane is interposed between the anode and the cathode and hydrogen ions move across the membrane, where they combine with electrons to form hydrogen gas. The membrane must be durable enough to withstand the caustic environment of the electrolysis process as well as the physical stress of the sometimes violent production of hydrogen and oxygen gas. Waste heat is also generated in the process, which, if recovered, may result in an increase in the overall efficiency of the electrolytic process.

There are many sources of the electric energy needed to generate hydrogen by the process of electrolysis. Traditional sources include burning fossil fuels such as coal, petroleum derivatives, and natural gas and nuclear plants and non-traditional sources such as wind power and solar panels may also be used. The flexibility to utilize electricity generated by a variety of sources can provide greater reliability of hydrogen generation. Utilizing electricity to generate hydrogen can also provide a convenient storage medium which may be used to dampen time-dependent fluctuations in power supply and energy demand.

SUMMARY

Electrochemical apparatus and processes can utilize electricity to induce a chemical reaction, such as the separation of water into its component element hydrogen and oxygen in an electrolyzer, or to provide electrical energy by combining hydrogen and oxygen to produce water, as in a fuel cell.

A comprehensive electrolytic hydrogen generation process may effectively utilize clean alternative power, make hydrogen fuel available without relying upon a complex and expensive hydrogen distribution infrastructure, and eliminate complex and expensive waste disposal problems.

Included is a ripstop nylon fabric membrane, or other similarly formed fabric membrane, for an electrochemical apparatus and process that is both durable and low-cost. Optionally, the ripstop nylon membrane is combined with a plastisol-based gasket in a membrane assembly. Also included are light-weight, low-cost high-density polyethylene (HDPE), or polypropylene components, which components can be formed to frame both single electrodes and single membranes in one-piece modules. Multiple electrode modules and membrane modules can be combined to produce a multi-cell electrolyzer system. Also included are small inter-electrode gaps and high electrode-water contact areas to help effect high-efficiency electrolyzer operation. Included, too, are effective and low-cost safety and process control features that help reduce or minimize the dangers of the electrolytic generation of hydrogen.

An electrolyzer can flexibly utilize electrical power from a variety of sources. Wind of any speed sufficient to turn a wind turbine may be utilized. Either wind or solar power can be converted to hydrogen and stored during off-peak times or when such generated electrical power is more than required to meet demand. A rectifier may be provided to convert conventional AC power to provide DC to the electrolyzer if desired. Batteries may be charged by either wind or solar power and later used to power the electrolyzer or to smooth out changes in source.

Waste heat may be captured and put to other uses. For example, by enclosing the electrolyzer, water or other heat transfer medium may be circulated to provide heat for a residence or office. By enclosing the hydrogen and oxygen collection towers, air or other suitable heat transfer media may be circulated to collect additional waste heat. Further efficiencies may be obtained by circulating water or other suitable heat transfer medium through heat-transfer coils included within the towers.

In one embodiment, an apparatus comprises a first compression plate; a first insulator plate next to the first compression plate; a first electrode next to the first insulator plate; a first end frame next to the first electrode, the first end frame having an aperture, a liquid inlet, a channel formed between the aperture and the liquid inlet, a gas outlet, and a channel formed between the aperture and the gas outlet; the apparatus further comprising at least one membrane-electrode assembly, the at least one membrane-electrode assembly next to the first end frame and comprising a membrane assembly, the membrane assembly comprising a ripstop nylon membrane and a gasket affixed to a border of the membrane; the at least one membrane-electrode assembly further comprising a first interior frame, the first interior frame comprising an aperture, at least one liquid inlet, a channel formed between the aperture and the liquid inlet, a gas outlet, and a channel formed between the aperture and the gas outlet; the at least one membrane-electrode assembly further comprising an interior electrode and a second interior frame, the second interior frame comprising an aperture, at least one liquid inlet, a channel formed between the aperture and the liquid inlet, a gas outlet, and a channel formed between the aperture and the gas outlet; the apparatus further comprising a further membrane assembly, the further membrane assembly next to the membrane-electrode assembly and comprising a ripstop nylon membrane and a gasket affixed to a border of the membrane; the apparatus further comprising a second end frame, the second next to the further membrane assembly and comprising an aperture, a liquid inlet, a channel formed between the aperture and the liquid inlet, a gas outlet, and a channel formed between the aperture and the gas outlet; the apparatus further comprising a further electrode, the further electrode next to the second end frame; a second insulator plate, the second insulator plate next to the further electrode; and a second compression plate, the second compression plate next to the second insulator plate. The further electrode, the second insulator plate, and the second compression plate may each further include a liquid inlet and a gas outlet.

As will be appreciated by those skilled in the relevant art, these elements will be interleaved with one another to create an electrochemical apparatus, and especially an electrolyzer.

In a further embodiment, a membrane for an electrolyzer comprises a synthetic fabric. In a further embodiment, the synthetic fabric comprises nylon. In a further embodiment, the nylon comprises ripstop nylon. In a further embodiment, the membrane comprises a fabric constructed to include the crosshatch pattern seen in ripstop fabrics such as ripstop nylon.

In a further embodiment, a method comprises impressing a DC electric current across a ripstop nylon membrane.

In a further embodiment, a method comprises applying a plastisol border to a ripstop nylon membrane.

In a further embodiment, a method comprises (a) placing a first side of a first insulator plate against a second side of a first compression plate; (b) placing a first side of a first electrode against a second side of the first insulator plate; (c) placing a first side of a first end frame against a second side of the first electrode, the first end frame comprising: a second side; a liquid inlet forming a hole between the first side and the second side; a channel formed on the first side between the aperture and the liquid inlet; a gas outlet forming a hole between the first side and the second side; and a channel formed on the first side between the aperture and the gas outlet; (d) placing a first membrane assembly side of at least one membrane-electrode assembly against the second side of the first end frame, the at least one membrane-electrode assembly comprising: a membrane assembly, the membrane assembly comprising: a ripstop nylon membrane; and a gasket affixed to a border of at least one side of the membrane; a first frame, the first frame defining an aperture, and comprising: a first side, the first side facing and abutting a second side of the membrane assembly; a second side; a liquid inlet forming a hole between the first side and the second side; a channel formed on the second side between the aperture and the liquid inlet; a gas outlet forming a hole between the first side and the second side; and a channel formed on the second side between the aperture and the gas outlet; an interior electrode, a first side of the interior electrode facing and abutting the second side of the first interior frame; and a second frame, the second frame defining an aperture, and comprising: a first side, the first side facing and abutting a second side of the interior electrode; a second side; a liquid inlet forming a hole between the first side and the second side; a channel formed on the first side between the aperture and the liquid inlet; a gas outlet forming a hole between the first side and the second side; and a channel formed on the first side between the aperture and the gas outlet; (e) placing a first side of a further membrane assembly against the second side of the second frame of the membrane-electrode assembly; (f) placing a first side of a second end frame against a second side of the further membrane assembly; (g) placing a first side of a further electrode against a second side of the second end frame; (h) placing the first side of a second insulator plate against a second side of the further electrode; and (i) placing a first side of a second compression plate against a second side of the second insulator plate. The further electrode, the second insulator plate, and the second compression plate may each further include a liquid inlet and a gas outlet.

In a further embodiment, a process comprises: (a) introducing a portion of an aqueous solution into a cathodic chamber, the cathodic chamber defined by a cathode and a membrane, the membrane comprising ripstop nylon; (b) introducing a portion of the aqueous solution into an anodic chamber, the anodic chamber defined by an anode and the membrane, the anodic chamber in fluid communication with the cathodic chamber, the anode positioned such that the membrane is interposed between the cathode and the anode; (c) applying a DC electrical potential between the cathode and the anode, whereby the application of the DC electrical potential effects a DC potential across the membrane; (d) withdrawing a first electrolytic decomposition product of water from the cathodic chamber; and (e) withdrawing a second electrolytic decomposition product of water from the anodic chamber.

In a further embodiment, the cathodic chamber (immediately above) is further defined by the aperture of a first frame, the first frame interposed between the cathode and the membrane (immediately above); and the anodic chamber (immediately above) is further defined by the aperture of a second frame, the second frame interposed between the anode and the membrane; and wherein: step (d) (immediately above) further comprises the step of: (A) withdrawing the first electrolytic decomposition of water product (immediately above) from the cathodic chamber through a first product channel and a first product outlet, the first product outlet in fluid communication with the cathodic chamber via the first product channel; and step (e) (immediately above) further comprises the step of: (B) withdrawing the second electrolytic decomposition of water product (immediately above) from the anodic chamber through a second product channel and a second product outlet, the second product outlet in fluid communication with the anodic chamber via the second product channel.

In a further embodiment, a process comprises: (a) introducing a portion of an aqueous solution into a plurality of cathodic chambers, each cathodic chamber defined by a membrane, the membrane comprising ripstop nylon, and an electrode; (b) introducing at least a portion of the aqueous solution into a plurality of anodic chambers, each anodic chamber at least partially defined by a membrane and an electrode, wherein cathodic chambers alternate with anodic chambers; (c) effecting a DC potential across each membrane; (d) withdrawing at least one electrolytic decomposition product of water from at least one of the plurality of cathodic chambers; and (e) withdrawing at least one electrolytic decomposition product of water from at least one of the plurality of anodic chambers.

In a further embodiment, a process comprises: (a) introducing a portion of an aqueous solution into a cathodic chamber, the cathodic chamber defined by a cathode and a first membrane; (b) introducing a portion of the aqueous solution into an anodic chamber, the anodic chamber defined by an anode and a second membrane; (c) introducing a portion of the aqueous solution into a plurality of further cathodic chambers, the plurality of further cathodic chambers at least partially defined by a bi-polar electrode and a further membrane; (d) introducing a portion of the aqueous solution into a plurality of further anodic chambers, the plurality of further anodic chambers at least partially defined by a bi-polar electrode and a further membrane; (e) applying a DC electrical potential between the cathode and the anode, whereby the application of the DC electrical potential effects a DC potential across each membrane; (f) withdrawing hydrogen gas from at least one cathodic chamber; and (g) withdrawing oxygen gas from at least one anodic chamber, wherein at least one membrane comprises ripstop nylon.

In a further embodiment, a process comprises: (a) providing an apparatus, the apparatus comprising: (i) a cathode; (ii) a first end frame, the first end frame defining an aperture, the first end frame comprising: (A) a first side, the first side facing a second side of the cathode; (B) a second side; (C) a liquid inlet forming a hole between the first side and the second side; (D) a channel formed on the first side between the aperture and the liquid inlet; (E) a gas outlet forming a hole between the first side and the second side; and (F) a channel formed on the first side between the aperture and the gas outlet; (iii) at least one membrane-electrode assembly, a membrane side of the membrane-electrode assembly facing the second side of the first end frame, the at least one membrane-electrode assembly comprising: (A) a membrane, the membrane comprising ripstop nylon, the cathode, the first end frame, and the membrane defining a cathodic chamber; (B) a first interior frame, the first interior frame defining an aperture, and comprising: (a') a first side, the first side facing a second side of the membrane; (b') a second side; (c') a liquid inlet forming a hole between the first side and the second side; (d') a channel formed on the second side between the aperture and the liquid inlet; (e') a gas outlet forming a hole between the first side and the second side; and (f) a channel formed on the second side between the aperture and the gas outlet; (C) an interior electrode, the first side of the interior electrode facing the second side of the first interior frame, the membrane, the first interior frame, and the interior electrode defining an anodic chamber; (D) a second interior frame, the second interior frame defining an aperture, and comprising: (a') a first side, the first side facing a second side of the electrode; (b') a second side; (c') a liquid inlet forming a hole between the first side and the second side; (e') a channel formed on the first side between the aperture and the liquid inlet; (f) a gas outlet forming a hole between the first side and the second side; and (g') a channel formed on the first side between the aperture and the gas outlet; (iv) a further membrane, the further membrane comprising ripstop nylon, a first side of the further membrane facing the second side of a second interior frame, the interior electrode, the second interior frame, and the further membrane defining a cathodic chamber; (v) a second end frame, the second end frame defining an aperture, and comprising: (A) a first side, the first side facing a second side of the further membrane; (B) a second side; (C) a liquid inlet forming a hole between the first side and the second side; (D) a channel formed on the second side between the aperture and the liquid inlet; (E) a gas outlet forming a hole between the first side and the second side; and (F) a channel formed on the second side between the aperture and the gas outlet; (vi) an anode, a first side of the anode facing the second side of the second end frame, the further membrane, the second end frame, and the further electrode defining an anodic chamber; (b) introducing an aqueous solution into each cathodic chamber via a liquid inlet hole and a liquid inlet channel; (c) introducing the aqueous solution into each anodic chamber via a liquid inlet hole and ail quid inlet channel; (d) applying a DC electrical potential between the cathode and the anode, whereby the application of the DC electrical potential effects a DC potential across each membrane; (e) withdrawing hydrogen from each cathodic chamber via a gas outlet hole and a gas outlet channel; and (f) withdrawing oxygen from each anodic chamber via a gas outlet hole and a gas outlet channel.

In a further embodiment, a membrane module is provided which comprises a membrane suspended and secured within a frame. The membrane may comprise, for example, and as noted herein above, ripstop nylon or a fabric constructed to include the crosshatch pattern seen in ripstop fabrics such as ripstop nylon. The frame comprises, for example, and as noted herein above, high-density polyethylene (HDPE) or polypropylene. The membrane module frame is formed to include a wedge-shaped curtain which provides stability to the frame and which facilitates separation of the component gases, for example hydrogen and oxygen. Formed onto the curtain are a plurality of protrusions which help maintain separation between the adjacent electrode and the curtain. The membrane module frame is further formed to include, as shown and described herein, water inlets and gas outlets.

In a further embodiment, a mold is provided for producing the membrane module as described herein. The mold is adapted to suspend and secure the membrane during formation of the module and to provide a module which secures the membrane within the frame after formation of the module. In a further embodiment, the mold is a two-part mold. In a further embodiment, the mold is adapted to further provide a module which includes a curtain. In a further embodiment, the mold is adapted to further provide a module which includes at least one curtain protrusion. In a further embodiment, the mold is adapted to further provide a module which includes at least one gas slope.

In a further embodiment, a process is provided for forming the membrane module, the process comprises suspending the membrane onto a mold portion, mating two portions of a two-part mold, securing the membrane within the closed mold, and injecting frame material, for example HDPE or polypropylene, into the closed mold. The mold is adapted to suspend and secure the membrane during formation of the module and to provide a module which secures the membrane within the frame after formation of the module.

In a further embodiment, a process of creating a manufacture is provided, the manufacture comprises a frame, the frame comprises a frame outer edge, the frame outer edge comprises a frame outer edge top portion, a ledge, the ledge in a spaced-apart relation to the frame outer edge, the ledge comprises a ledge inner edge, the ledge inner edge comprises a ledge inner edge top portion, the ledge inner edge top portion defines a gas slope, the gas slope positioned and adapted to facilitate the upward passage of evolved gas, a wedge-shaped curtain, the curtain extends from the ledge inner edge top portion and extends away from the frame outer edge top portion, the curtain comprises a curtain top portion, the curtain top portion begins at the ledge inner edge top portion, a curtain lower edge, the curtain lower edge thinner than the curtain top portion, and at least one curtain protrusion, the at least one curtain protrusion proximate the curtain lower edge, and an aperture, the aperture defined by the curtain lower edge, and a portion of the ledge not including the ledge inner edge top portion; and a membrane, the membrane suspended and secured within the aperture; the process comprises the steps of (a) placing the membrane onto at least two of a first portion mold section plurality of membrane hangers, the first portion mold section further comprises at least one pinch hole protrusion, (b) mating the first portion mold section with a second portion mold section, thereby creating a mold cavity, the mold cavity formed to define the frame, the second mold portion section comprises at least one pinch hole protrusion in juxtaposition to the first mold portion at least one pinch hole protrusion, thereby securing the membrane between the first portion mold section at least one pinch hole protrusion and the second portion mold section at least one pinch hole protrusion, and (c) injecting a plastic into the mold cavity, whereby the manufacture is created.

In a further embodiment, a manufacture is provided, the manufacture comprising a first portion mold section and a second portion mold section, wherein at least one mold section comprises a plurality of membrane hangers, and wherein the first portion mold section and the second portion mold section are adapted to mate and form a mold cavity. In a further embodiment, at least one mold section comprises at least one pinch hole protrusion. In a further embodiment, at least one mold section comprises at least one curtain protrusion indent. In a further embodiment, the mold cavity is formed to define a frame, the frame comprising a frame outer edge, the frame outer edge comprising a frame outer edge top portion, a ledge, the ledge in a spaced-apart relation to the frame outer edge, the ledge comprising a ledge inner edge, the ledge inner edge comprising a ledge inner edge top portion, the ledge inner edge top portion defining a gas slope, the gas slope positioned and adapted to facilitate the upward passage of evolved gas, a wedge-shaped curtain, the curtain extending from the ledge inner edge top portion and extending away from the frame outer edge top portion, the curtain comprising a curtain top portion, the curtain top portion beginning at the ledge inner edge top portion, a curtain lower edge, the curtain lower edge thinner than the curtain top portion, and at least one curtain protrusion, the at least one curtain protrusion proximate the curtain lower edge, and an aperture, the aperture defined by the curtain lower edge and a portion of the ledge not including the ledge inner edge top portion.

In a further embodiment, a process is provided, the process comprising the steps of (a) placing a membrane onto at least two of a first portion mold section plurality of membrane hangers, the first portion mold section further comprising at least one pinch hole protrusion, (b) mating the first portion mold section with a second portion mold section, thereby creating a mold cavity, the second portion mold section comprising at least one pinch hole protrusion in juxtaposition to the first mold portion at least one pinch hole protrusion, thereby securing the membrane between the first mold portion at least one pinch hole protrusion and the second portion mold section at least one pinch hole protrusion, and (c) injecting plastic into the mold cavity. In a further embodiment, a manufacture is produced by the above process. In a further embodiment, at least one of the first portion mold section and the second portion mold section further includes at least one curtain protrusion indent, whereby at least one curtain protrusion is formed. In a further embodiment, the mold cavity is formed to define a gas slope, whereby a gas slope is formed. In a further embodiment, the mold cavity is formed to define a wedge-shaped curtain, whereby a wedge-shaped curtain is formed.

The details of one or more implementations are set forth in the accompanying drawings and the description below. Other features will be apparent from the description and drawings, and from the claims.

BRIEF DESCRIPTION OF THE SEVERAL VIEWS OF THE DRAWING

The accompanying drawings, which are incorporated in, and constitute a part of, this specification, illustrate several embodiments consistent with the invention and, together with the description, serve to explain the principles of the invention.

FIGS. 8 and 9 are circuit diagrams illustrating monitoring and control circuits for an electrolyzer and associated ancillary equipment.
FIG. 10 is a circuit diagram illustrating an oxygen sensor and associated control circuit.

DETAILED DESCRIPTION

Figure 1:
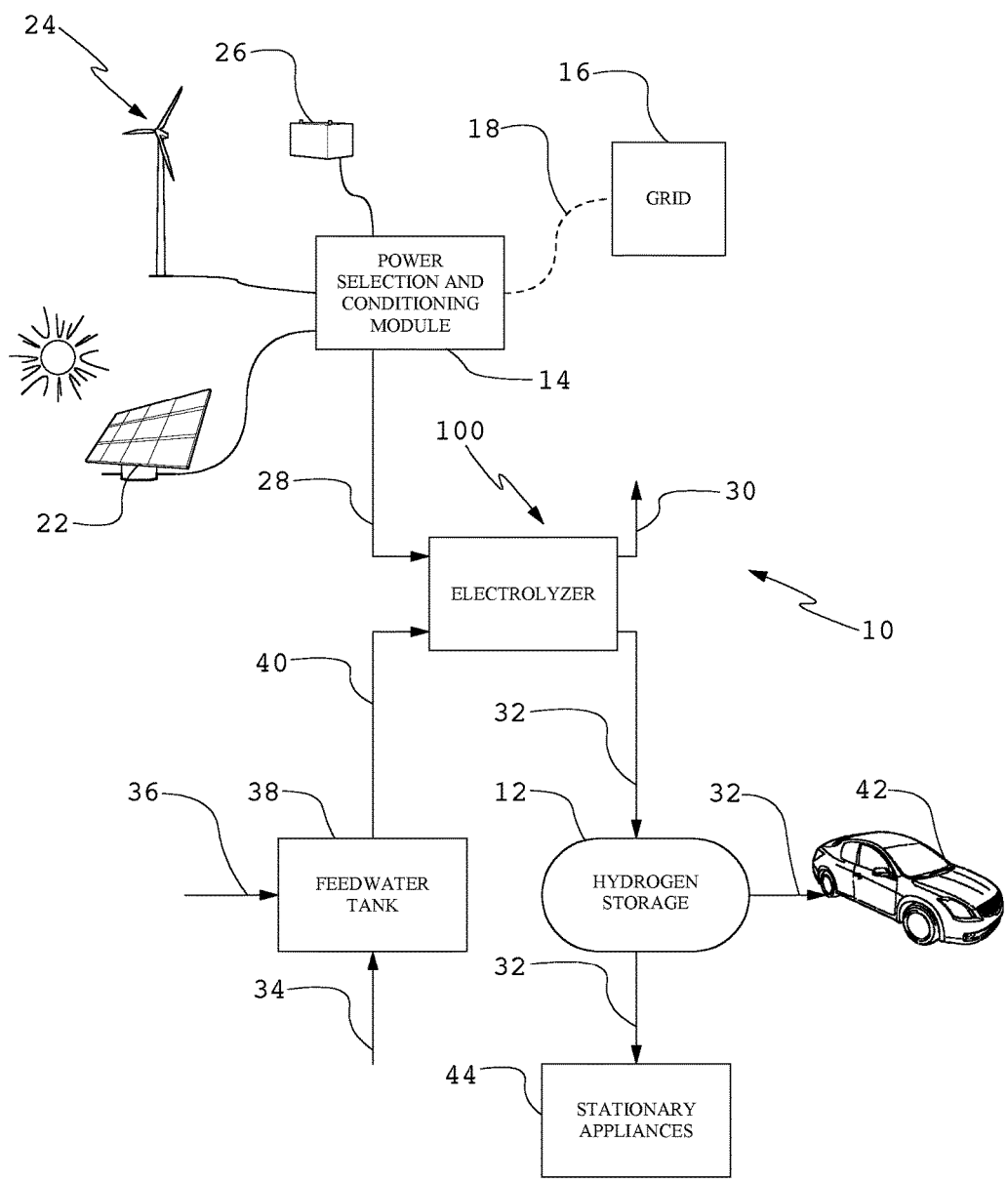
FIG. 1 is a block diagram illustrating a hydrogen system.

Referring to FIG. 1, a hydrogen system 10 includes an electrolyzer process 100 (shown also in FIGS. 2 and 7) adapted to produce hydrogen 32 from water 34 using electricity 28. The electrolyzer process 100 converts water 34 into its component parts of hydrogen 32 and oxygen 30. An electrolyte 36 is combined with the water 34 in a feedwater tank 38 and introduced into the electrolyzer process 100 as feedwater 40. Typically, the electrolyte 36 is sodium hydroxide (NaOH) or potassium hydroxide (KOH), but cations such as, but not limited to, lithium (Li$^+$), rubidium (Rb$^+$), potassium (K$^+$), cesium (Cs), barium (Ba$^{2+}$), strontium (Sr$^{2+}$), calcium (Ca$^{2+}$), sodium (Na$^+$), and magnesium (Mg$^{2+}$) may also be used. Those skilled in the relevant art will recognize that other compounds are suitable for providing an electrolyte 36 to the electrolyzer process 100. Direct current (DC) electricity 28 fed to the electrolyzer process 100 provides the necessary electricity 28 for producing hydrogen 32. Makeup water 34 is added as required. Electrolyte 36 is added as needed to maintain proper concentration.

An electrical power selection and conditioning module 14 enables the hydrogen system 10 to provide DC electricity 28 from a variety of sources which are appropriately connected thereto. By way of example only, such sources include solar panels 22, wind turbines 24, batteries 26, and the conventional power grid 16, which alternating current (AC) electricity 18 may be converted to DC by an AC-DC rectifier which may be included in the power selection and conditioning module 14. It will be appreciated by those skilled in the relevant art that sources other than those shown and discussed may also provide the necessary electric power 28. Advantageously, excess power from, for example, solar panels 22 or wind turbines 24, not required to operate the electrolyzer process 100, may be fed back into the grid 16 for credit or utilized in a residence, business, or other property.

As shown in FIG. 1, oxygen 30 may be vented to the atmosphere or further processed for other uses. Hydrogen 32 produced by the electrolyzer process 100 may be sent to storage 12 for further use and may be compressed (not shown) for storage at higher pressures as required. In a residential setting, for example, the hydrogen 32 may be used to fill an onboard supply vessel, for example, with a vehicle 42. Conventional stationary appliances 44 such a furnace, water heater, stove or oven, an absorption air conditioner or refrigerator, electrical generator, or fuel cell may be powered by the hydrogen 32. Finally, excess heat from the electrolyzer 102 or a hydrogen or oxygen collector 104, 106 (described more fully below) may help further reduce heat demands.

Figure 2:
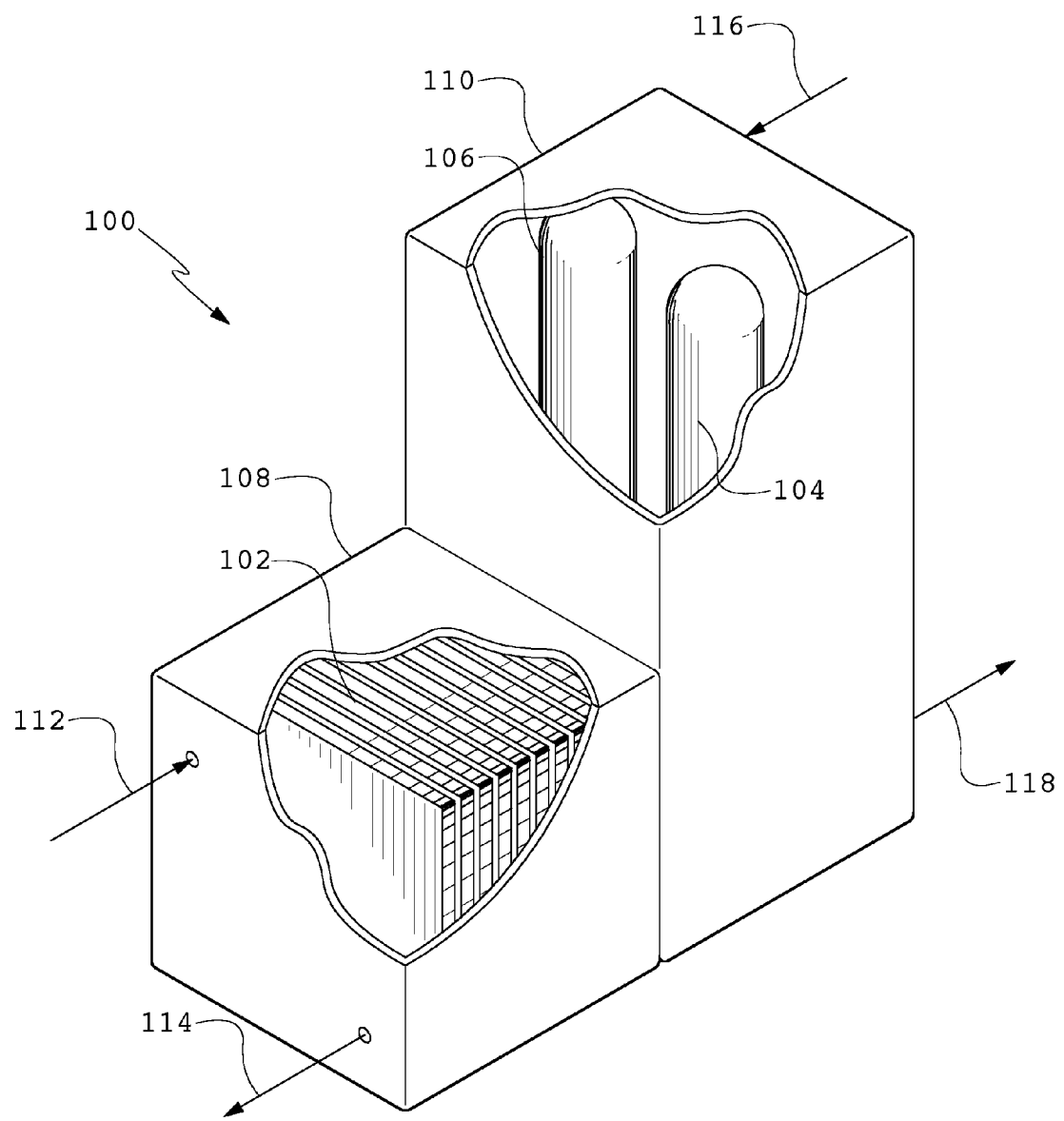
FIG. 2 is a partial cutaway view illustrating an electrolyzer and associated collection towers along with enclosures.

The electrolyzer 102 and selected ancillary components are shown in FIG. 2. An electrolyzer 102 (described more fully below) receives water via the hydrogen collector 104 and the oxygen collector 106 (both described more fully below). The hydrogen collector 104 collects hydrogen 32 generated by the electrolyzer 102 and the oxygen collector 106 collects oxygen 30 generated by the electrolyzer 102.

In an exemplary embodiment as shown in FIG. 2, the electrolyzer 102 is enclosed within a sealed electrolyzer enclosure 108 and the hydrogen and oxygen collectors 104, 106 are enclosed within a sealed collector enclosure 110. Water or other suitable heat transfer fluid may be circulated through the electrolyzer enclosure 108 and around the electrolyzer 102 as indicated by electrolyzer enclosure circulating heat transfer fluid in 112 and electrolyzer enclosure circulating heat transfer fluid out 114. The electrolyzer enclosure circulating heat transfer fluid circulating through the electrolyzer enclosure 108 may be heated by the electrolyzer 102 to, for example, 115 deg. F. and may be subsequently used for space heating or for heating hot water, especially in a residence. Air or other suitable heat transfer fluid may be circulated through the collector enclosure 110 and around the hydrogen and oxygen collectors 104, 106 as indicated by collector enclosure circulating heat transfer fluid in 116 and collector enclosure circulating heat transfer fluid out 118. The collector enclosure circulating heat transfer fluid circulating through the collector enclosure 110 is heated by the hydrogen and oxygen collectors 104, 106 to, for example, 130 deg. F. and may subsequently be used for space heating, heating hot water, or for powering an absorption air conditioner or refrigerator. In an exemplary embodiment, the electrolyzer enclosure 108 and the collector enclosure 110 are constructed with ¾-inch high density polyethylene (HDPE) panels and appropriately sealed to contain the circulating heat transfer fluid.

Figure 3:
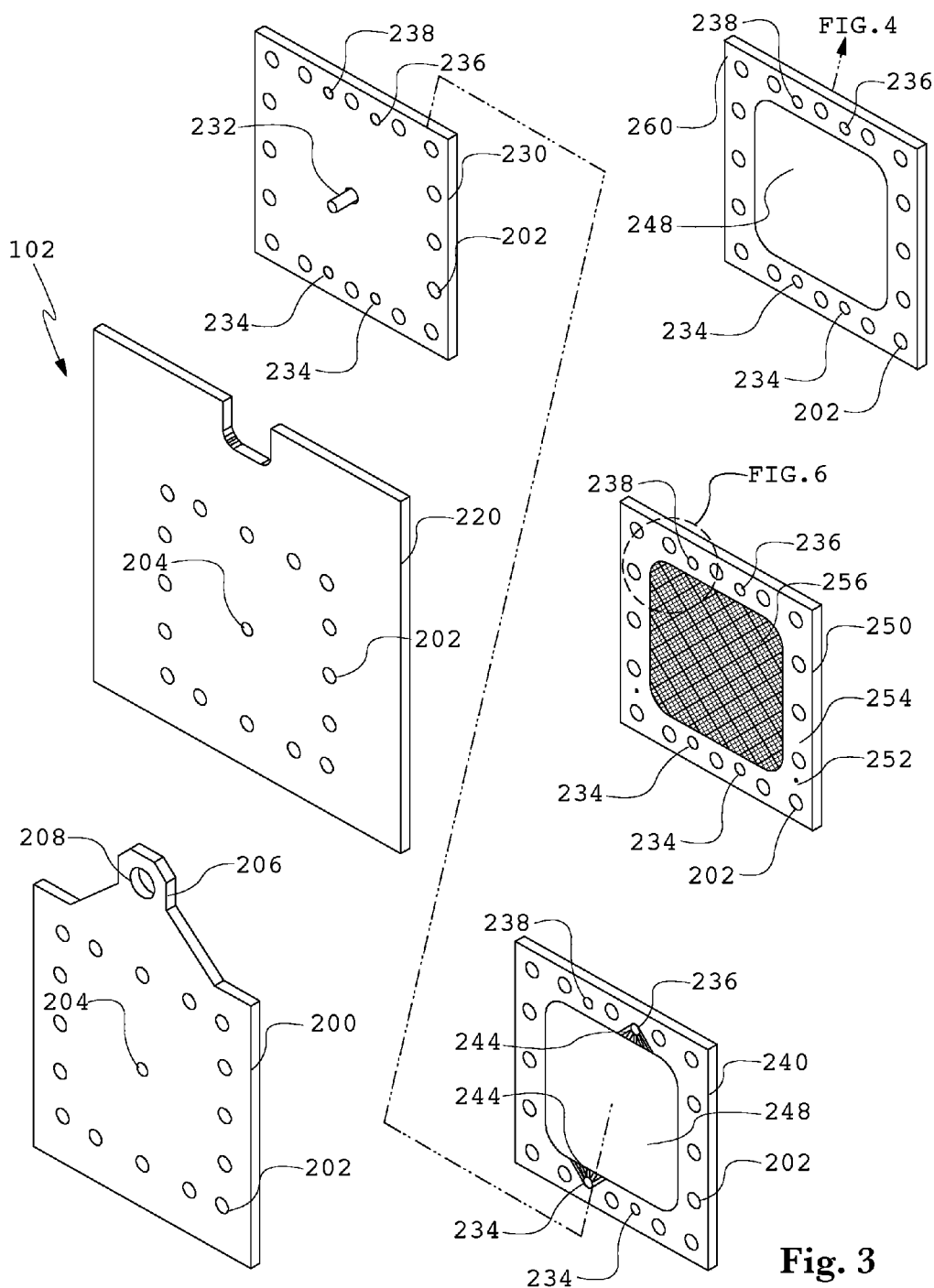
FIGS. 3 and 4 combine to give an exploded view illustrating components of an electrolyzer.
Figure 4:
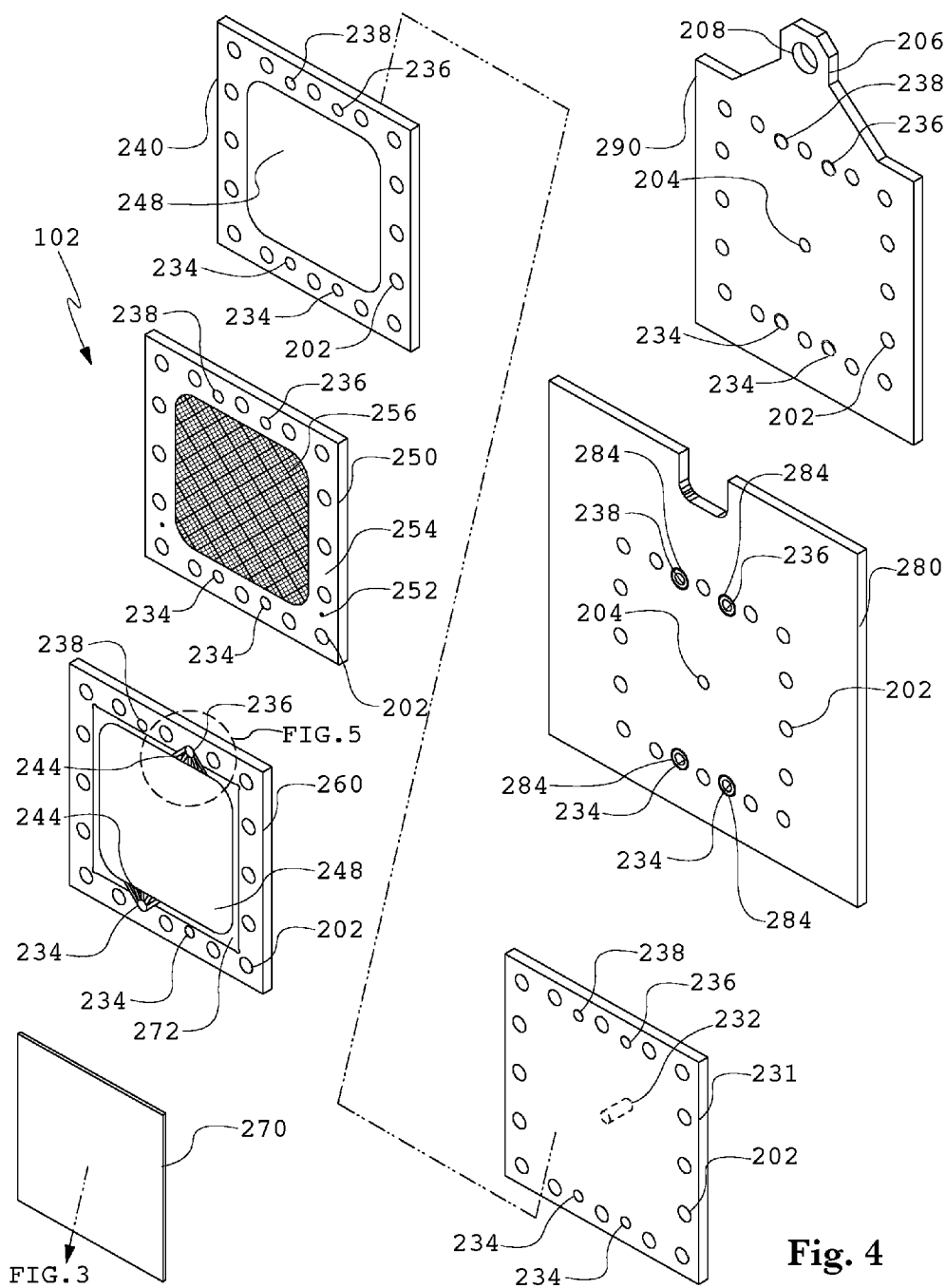

FIGS. 3 and 4 combine to illustrate an exemplary embodiment of a multi-cell electrolyzer 102. Going through in order, first is a stack closed end compression plate 200. In the illustrated embodiment, the stack closed end compression plate 200 has no means for allowing process streams in or out. Such connections are at the far end of the stack 102. In an exemplary embodiment, the stack closed end compression plate 200 is ¾-inch hot-rolled steel. The stack closed end compression plate 200 may also comprise a material such as cold-rolled steel, composite, or other material with sufficient strength. The stack closed end compression plate 200 includes a plurality of stack compression bolt holes 202. In the illustrated embodiment, there are 16 stack compression bolt holes 202 which receive a like number of stack compression bolts (not shown). The stack closed end compression plate 200 cooperates with a stack open end compression plate 290 (FIG. 4) and the plurality of stack compression bolts (not shown) to hold together and compress the electrolyzer 102. Also, in an exemplary embodiment, the stack closed end compression plate 200 includes an electrical stud hole 204 to receive, and to allow for protrusion of, an electrical stud 232 attached to an anode 230. The electrical stud 232 enables electrical current to be applied to the electrolyzer 102. As will be appreciated by those skilled in the relevant art, the anode 230 and the cathode 231 (FIG. 4) may be reversed and the ancillary collection equipment modified accordingly. In the illustrated embodiment, the stack closed end compression plate 200 further includes a stack lift tongue 206 including a stack lift hole 208 for facilitating lifting and transporting the electrolyzer 102. In an exemplary embodiment, the surface of the stack closed end compression plate 200 facing the stack closed end insulator plate 220 is treated with blanchard grinding.

Adjacent the stack closed end compression plate 200 is a stack closed end insulator plate 220. In an exemplary embodiment, the stack closed end insulator plate 220 is ¾-inch HDPE. Other non-conductive materials with sufficient strength and heat resistant properties, such as low density polyethylene (LDPE), polyurethane, nylon, and ceramic materials could be satisfactory. The stack closed end insulator plate 220 includes a series of stack compression bolt holes 202. In the illustrated embodiment, there are 16 stack compression bolt holes 202 which receive a like number of stack compression bolts (not shown). Also, in an exemplary embodiment, the stack closed end insulator plate 220 includes an electrical stud hole 204 to receive, and to allow for protrusion of, the electrical stud 232 attached to the anode 230. The stack closed end insulator plate 220 may further include a set of seals (not shown) such as O-rings seated in a like set of seal grooves (not shown) formed to seal one or more water inlets 234 an oxygen outlet 236 and a hydrogen outlet 238 formed in the anode 230.

Adjacent to the stack closed end insulator plate 220 is the anode 230. The anode 230 includes the electrical stud 232 attached thereto which may be threaded for ease of connection to DC electrical power. As will be appreciated by those skilled in the relevant art, the anode 230 may be connected to DC electrical power in a number of ways, including, but not limited to, one or more tabs along the side edges of the anode 230. In an exemplary embodiment, the anode 230 is constructed of 11-gauge 316 stainless steel. In the illustrated embodiment, the anode 230 includes 16 stack compression bolt holes 202 which receive a like number of stack compression bolts (not shown). As assembled, the anode 230 is placed so its electrical stud 232 protrudes through the electrical stud holes 204 formed in the stack closed end insulator plate 220 and the stack closed end compression plate 200 and is connected to DC electrical power. In an exemplary embodiment, the anode 230 is formed with an oxygen outlet 236, a hydrogen outlet 238, and one or more water inlets 234.

Adjacent to the anode 230 is a first end frame 240. Shown in FIG. 3 is the anode side of the first end frame 240. In an exemplary embodiment, the first end frame 240 is HDPE. As with the insulator plates 220, 280 (FIG. 4), and the interior frames 260 (FIGS. 3 and 4), the end frames 240 could comprise LDPE, polyurethane, nylon, or ceramic material. The first end frame 240 includes a chamber aperture 248 and, in the illustrated embodiment, 16 stack compression bolt holes 202 which receive a like number of stack compression bolts (not shown). The first end frame 240 further includes at least one water inlet 234. In the illustrated embodiment, the anode side of the first end frame 240 includes at least one channel 244 formed between the at least one water inlet 234 and the chamber aperture 248 and, thus, provides fluid connectivity between the water inlet 234 and the chamber aperture 248. In the illustrated embodiment, the anode side of the first end frame 240 includes at least one channel support 246. (Shown in analogous fashion in FIG. 5.) The at least one channel support 246 helps maintain the integrity of the channel 244 when the electrolyzer 102 is under compression.

Figure 5:
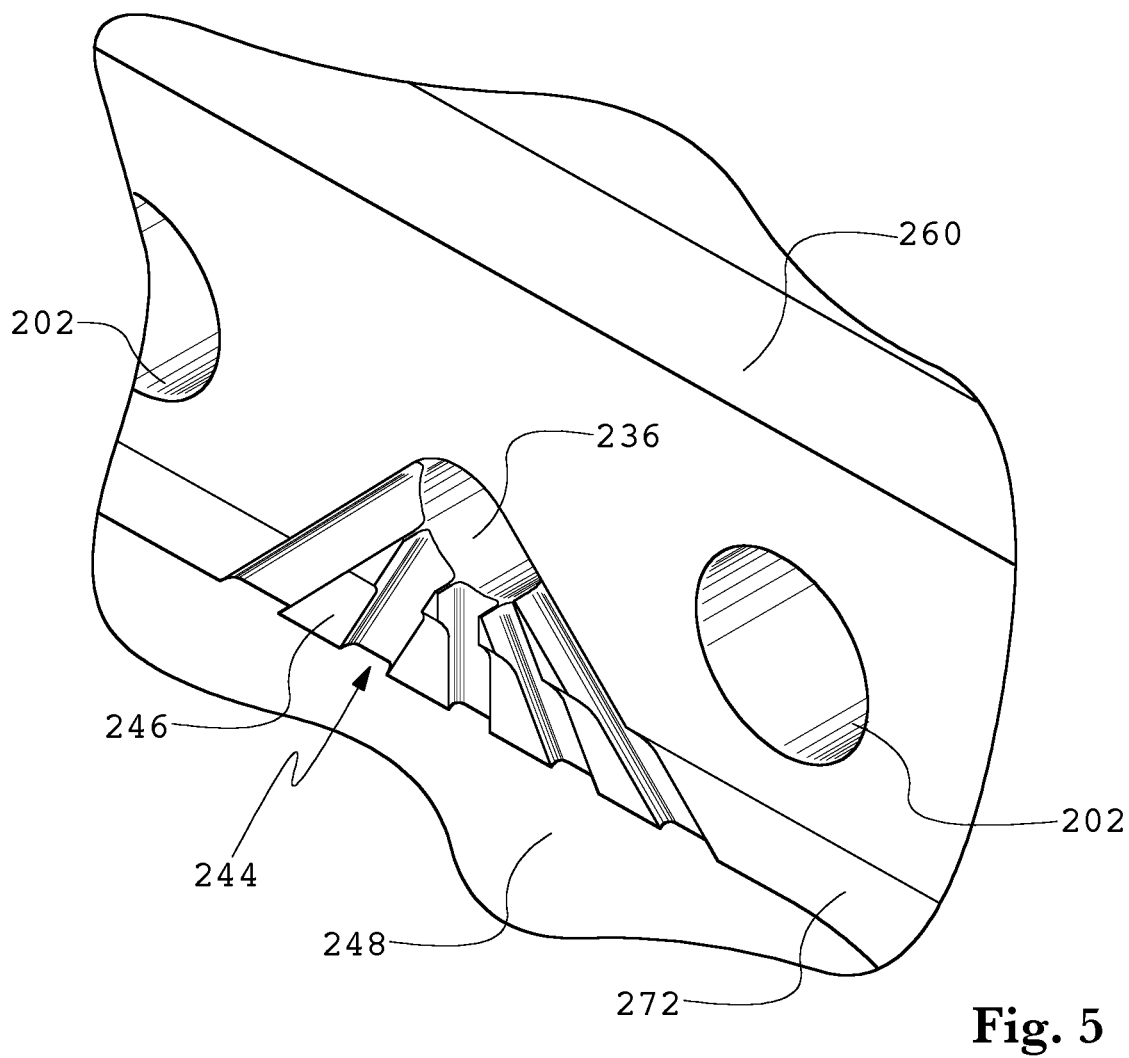
FIG. 5 illustrates the detail of a channel.

The first end frame 240 further includes an oxygen outlet 236 and a hydrogen outlet 238. In the illustrated embodiment, the anode side of the first end frame 240 includes a channel 244 formed between the oxygen outlet 238 and the chamber aperture 248. In the illustrated embodiment, the anode side of the first end frame 240 includes at least one channel support 246 (FIG. 5). The reverse side of the first end frame 240, which faces, and is adjacent to, a first membrane assembly 250, is described herein below when describing a membrane assembly side of a first interior frame 260.

Referring again to FIG. 3, adjacent to the first end frame is the first membrane assembly 250. In an exemplary embodiment, the first membrane assembly 250 comprises a membrane 256 and an associated membrane gasket 254. In a further exemplary embodiment, the membrane 256 is ripstop nylon with a thread count per square inch of 118×92 and with a weight per square yard of about two ounces. Ripstop nylon is durable and less-expensive than alternative materials and it is resistant to chemical attack by caustic feedwater 40. In an exemplary embodiment, the nylon used in the membrane material is nylon 6,6. In a further exemplary embodiment, the nylon used in the membrane material is nylon 6. In an exemplary embodiment, the ripstop nylon membrane 256 is treated with a fluorocarbon-based water-repellent. In a further exemplary embodiment the ripstop nylon membrane 256 is not so treated. When wet, the membrane 256 enables electrons to selectively pass through. Additionally, and although not wishing to be bound by any particular theory, it is believed that the structure of the ripstop nylon material, with its interwoven ripstop reinforcement threads in a crosshatch pattern, may effect a concentration of current density and improve cell efficiency.

In an exemplary embodiment, the membrane may also comprise other synthetic fabric materials. Polyamides, of which nylon is at type, also include aramids, a class of strong, heat-resistant fibers comprising aromatics.

The membrane gasket 254 effects a seal of the membrane 256 when included in the electrolyzer 102. In an exemplary embodiment, the membrane gasket 254 comprises plastisol bonded to a border of the membrane 256. The plastisol may be applied via a silkscreen process. The border of one side of the membrane 256 is coated with plastisol and heated, typically in an oven, sufficiently to bond the plastisol to the membrane 256, in one exemplary embodiment, generally between about 140 deg. C. and about 170 deg. C. for between about 45 seconds and about 60 seconds. In another exemplary embodiment, about 175 deg. C. for about 90 seconds. The membrane 256 is then turned over and the border of the other side of the membrane 256 is coated with plastisol and heated as before. The bonds are complete after about 72 hours. Before treating with plastisol to form the membrane gasket 254, the original dimensions of the membrane 256 are larger to accommodate shrinkage in the heating process.

The membrane gasket 254 comprises at least one water inlet 234, an oxygen outlet 236, a hydrogen outlet 238, and a series of stack compression bolt holes 202. A die punch may be used to form these holes, inlets, and outlets and may include a series of alignment jig posts (not shown). A series of alignment marks or holes 252 may be included on the membrane assembly 250 which cooperate with the die punch alignment jig posts to enable the membrane assembly 250 to be properly aligned on the die punch.

Plastisols are used to print textiles and are composed primarily of polyvinyl chloride (PVC) resin, typically a white powder, and a plasticizer, typically a thick, clear liquid. Optionally, a colorant may be added. The inks must be heated to cure, generally at temperatures in the range of 140-170 deg. C., as discussed above. The porosity of the textile permits good plastisol penetration and, therefore, good adhesion of the plastisol to the textile. When used with tightly-woven ripstop nylon, however, the plastisol may be combined with a nylon binding agent such as Nylobond™ Bonding Agent (NYBD-9120) (Union Ink Co., Ridgefield, N.J.). In an exemplary embodiment, the ink is Ultrasoft PLUS (PLUS-6000) (Union Ink Co.) and is formulated.

In a further exemplary embodiment, the plastisol is 900-series, such as 902LF, from International Coatings Co. (Cerritos, Calif.). These plastisol formulations include a premixed bonding agent catalyst. Exemplary curing is about 175 deg. C. for about 90 seconds.

In an exemplary embodiment, the membrane assembly 250 is about 0.009 inches thick at the membrane gasket 254. Under compression in the electrolyzer 102, the membrane gasket 254 compresses and the membrane assembly 250 compresses to about 0.005 inches.

Referring again to FIG. 3, adjacent to the first membrane assembly 250 is a first interior frame 260. Shown in FIG. 3 is the first membrane side of the first interior frame 260. In an exemplary embodiment, the first interior frame 260 is HDPE. The first interior frame includes a chamber aperture 248 and, in the illustrated embodiment, 16 stack compression bolt holes 202 which receive a like number of stack compression bolts (not shown). The first interior frame 260 also includes at least one water inlet 234, an oxygen outlet 236, and a hydrogen outlet 238.

The side of the first interior frame 260 which faces an interior electrode 270 is further described herein below with the second interior frame 260. On the interior electrode side of the first interior frame 260 is an electrode ledge 272 formed around the chamber aperture 248 into which the interior electrode 270 may nest. In an exemplary embodiment, the electrode ledge 272 has a depth of one-half the thickness of the interior electrode 270. As will be appreciated by those skilled in the art, the interior electrode side of the first interior frame 260, discussed below with the second interior frame 260, and shown in detail in FIG. 4, includes a channel 244 (not shown, but illustrated analogously with the second interior frame 260 of FIG. 4), analogous to the channel 244, formed between the hydrogen outlet 238 (not shown, but illustrated analogously with the second interior frame 260 in FIG. 4) and the chamber aperture 248. The channel 244 may further include at least one channel support 246 (FIG. 5).

Turning now to FIG. 4, adjacent to the first interior frame 260 is an interior electrode 270. As will be appreciated by one skilled in the relevant art, the interior electrode 270 operates as a bi-polar electrode. In an exemplary embodiment, the interior electrode 270 is sized to nest within the electrode side of each interior frame 260. In an exemplary embodiment, the interior electrode 270 is 18-gauge 316 stainless steel.

Adjacent to the interior electrode 270 is a second interior frame 260. As shown in FIG. 4, the interior electrode side of the second interior frame 260 faces the interior electrode 270. In an exemplary embodiment, the second interior frame 260 is HDPE. The second interior frame 260 includes a chamber aperture 248 and, in the illustrated embodiment, 16 stack compression bolt holes 202, which receive a like number of stack compression bolts (not shown). The second interior frame 260 also includes at least one water inlet 234, and oxygen outlet 236, and a hydrogen outlet 238.

The side of the second interior frame 260 which faces the interior electrode 270 includes an electrode ledge 272 formed around the chamber aperture 248 into which the interior electrode 270 may nest. In an exemplary embodiment, the electrode ledge 272 has a depth of one-half the thickness of the interior electrode 270. The interior electrode side of the second interior frame 260 includes a channel 244 formed between the oxygen outlet 236 and the chamber aperture 248. The channel 244 may further include at least one channel support 246 (FIG. 5).

The side of the second interior frame 260 which is adjacent to, and faces, a second membrane assembly 250 is analogously shown in detail and described with the side facing the first membrane assembly 250 of the first interior frame 260 (FIG. 3).

Adjacent to the second membrane assembly side of the second interior frame 260 is a second membrane assembly 250, which has been described herein above with the first membrane assembly 250.

Adjacent to the second membrane assembly 250 is a second end frame 240. In an exemplary embodiment, the second end frame 240 is HDPE. The second end frame 240 includes a chamber aperture 248 and, in the illustrated embodiment, 16 stack compression bolt holes 202 which receive a like number of stack compression bolts (not shown). The second end frame 240 further includes at least one water inlet 234, an oxygen outlet 236, and a hydrogen outlet 238. Shown in analogous detail in FIG. 3, and as described analogously above in reference to the first end frame 240, the cathode side of the second end frame 240 further includes a channel 244 (shown in analogously in FIG. 3 and discussed above with the first end frame 240) formed between the chamber aperture 248 and the hydrogen outlet 238. Further, the channel 244 may include at least one channel support 246.

Likewise, the cathode side of the second end frame 240 further includes a channel 244 formed between the chamber aperture 248 and the at least one water inlet 234. Further, this channel 244 may include at least one channel support. 246.

Adjacent to the cathode side of the second end frame 240 is the cathode 231. The description of the cathode 231 is similar to that of the anode 230. The cathode 231 further includes an oxygen outlet 236, a hydrogen outlet 238, and one or more water inlets 234.

Adjacent to the cathode 231, and interposed between the cathode 231 and a stack open end compression plate 290, is a stack open end insulator plate 280. While the stack open end insulator plate 280 is formed similarly to the stack closed end insulator plate 220, the stack open end insulator plate 280 further includes at least one water inlet 234, an oxygen outlet 236, and a hydrogen outlet 238. In an exemplary embodiment, the stack open end insulator plate 280 is ¾-inch HDPE. The stack open end insulator plate 280 includes a series of stack compression bolt holes 202. In the illustrated embodiment, there are 16 stack compression bolt holes 202 which receive a like number of stack compression bolts (not shown). Also, in an exemplary embodiment, the stack open end insulator plate 280 includes an electrical stud hole 204 to receive, and to allow for protrusion of, the electrical stud 232 attached to the cathode 231. On the cathode side of the stack open end insulator plate 280 may further include a set of seals such as O-rings (not shown) seated in a like set of grooves 284 formed to seal the one or more water inlets 234, the oxygen outlet 236, and the hydrogen outlet 238 formed in the cathode 231. Likewise, a similar set of grooves 284 and seals may be included in the open end compression plate side of the open end insulator plate 280.

Adjacent to the stack open end insulator plate 280 is the stack open end compression plate 290. In an exemplary embodiment, the stack open end compression plate 290 is ¾-inch hot-rolled steel plate. The stack open end compression plate 280 may also comprise a material such as cold-rolled steel, composite, or other material with sufficient strength. In an exemplary embodiment, the surface of the stack open end compression plate 290 facing the stack open end insulator plate 280 is treated with blanchard grinding. The stack open end compression plate 290 also includes at least one water inlet 234, an oxygen outlet 236, and a hydrogen outlet 238. Along a periphery of the stack open end compression plate 290 are a plurality of stack compression bolt holes 202. In the illustrated embodiment, there are 16 stack compression bolt holes 202 which receive a like number of stack compression bolts (not shown). Also, in an exemplary embodiment, the stack open end compression plate 290 includes an electrical stud hole 204 to receive, and to allow for protrusion of, an electrical stud 232 attached to the cathode 231.

The exemplary embodiment illustrated in FIGS. 3 and 4 shows one interior electrode 270. Larger capacities may be assembled by adding additional interior parts. For example, a plurality of assemblies, each assembly comprising a membrane assembly 250, a first interior frame 260, an interior electrode 270, and a second interior frame 260, may be included. As appropriate, a first end frame 240, an additional membrane assembly 250, and a second end frame 240, would be required.

Although not shown, the electrolyzer 102 may be held together with a plurality of stack compression bolts spanning the electrolyzer 102 from the stack closed end compression plate 200 and the stack open end compression plate 290. Each compression bolt may be surrounded, substantially along its entire length, by a seal (not shown), which may also function as an insulator. By way of example only, such seal could be Parflex® (Parflex Division, Parker-Hannifin, Ravenna, Ohio) 588N-10 non-conducting, high-pressure hose. In an exemplary embodiment, the compression bolts are torqued to 55 pounds.

Figure 11:
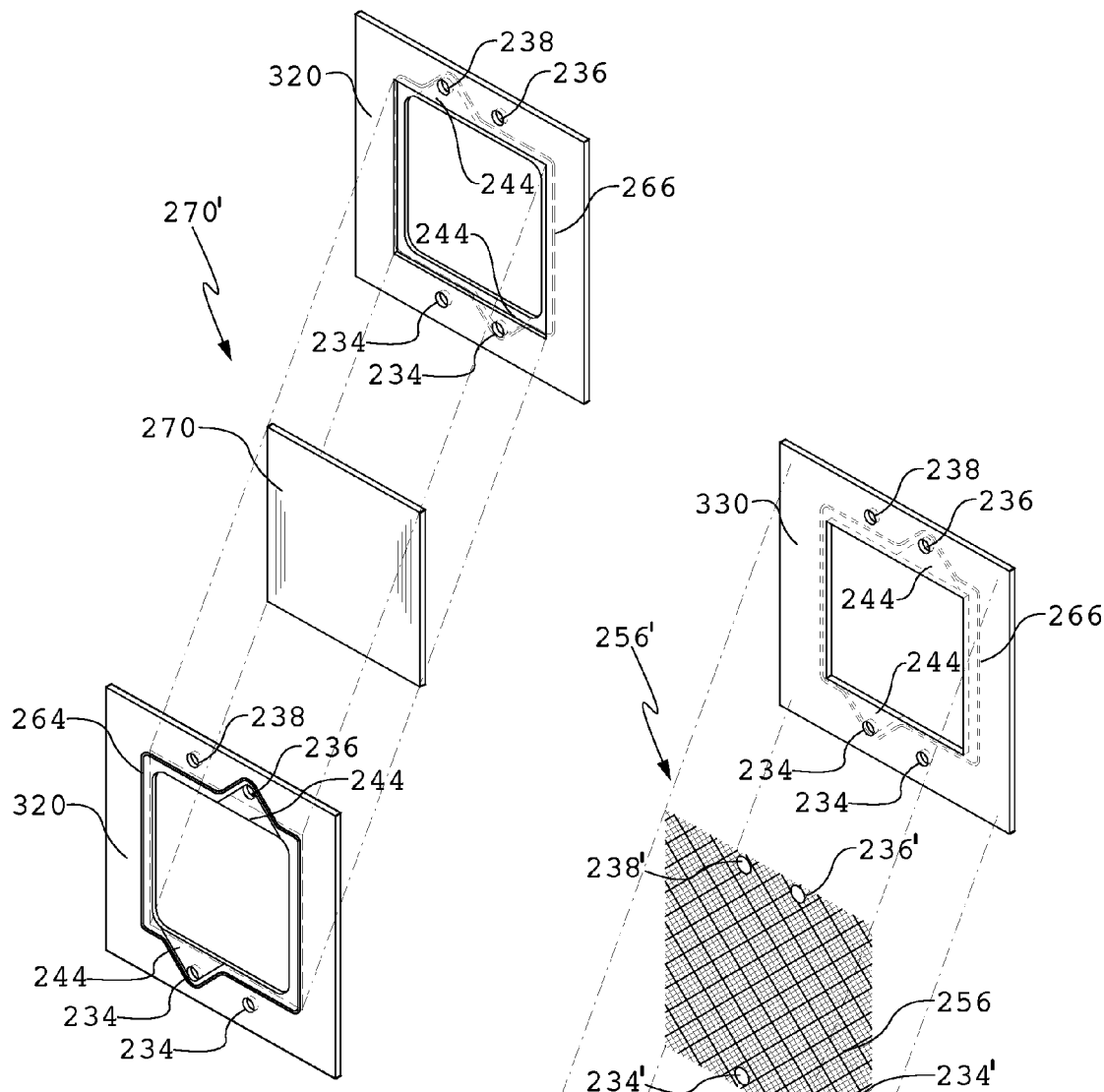
FIG. 11 is an exploded view of a framed electrode.

Turning now to FIG. 11, in an exploded view of a further exemplary embodiment, a framed electrode 270' may be provided and used in multi-cell electrolyzer. The electrode 270 is partially encased within, and formed as one with, two interior frames 320 which frames 320 may comprise HDPE. In the illustrated embodiment, the channels 244 have a depth that extends to the surface of the electrode 270. Channel supports 246 may be omitted. As illustrated in FIG. 11, one side of the framed electrode 270' may comprise a tongue 264 and the other side a coordinating groove 266 to enhance fit and seal. Multiple framed electrodes 270' could be combined with, for example, multiple framed membranes 256', described below.

Figure 12:
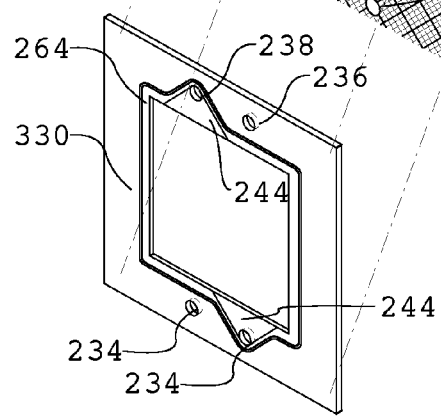
FIG. 12 is an exploded view of a framed membrane.

In a further exemplary embodiment shown in FIG. 12, a framed membrane 256' may also be provided and used in multi-cell electrolyzers 102. A membrane 256, which may not include a membrane gasket 254, is partially encased within, and formed as one with, two frames 330. As shown in FIG. 12, the membrane 256 is large enough to extend beyond the water inlets 234 and the hydrogen 238 and oxygen 236 outlets. In addition, the associated holes in the membrane 256 (shown as 234', 238', and 236', respectively) are larger than their counterparts. This enables the frame material (e.g., HDPE) to seal the holes 234, 238, and 236. In addition, where peripheral bolt holes 202 (not shown in FIG. 12) are included, such holes in the membrane 256 may also be larger. In the illustrated embodiment, the channels 244 have a depth that does not extend to the surface of the membrane. As illustrated in FIG. 12, one side of the framed membrane 256' may comprise a tongue 264 and the other side a coordinating groove 266 to enhance fit and seal.

In a further exemplary embodiment, the framed membrane 256' further comprises an electrode ledge 272 (FIG. 4, shown associated with the interior frame 260, e.g.) formed therein. As constructed, then, a plurality of framed membranes 256' may be stacked with an interior electrode 270 inserted therebetween.

Figure 13:
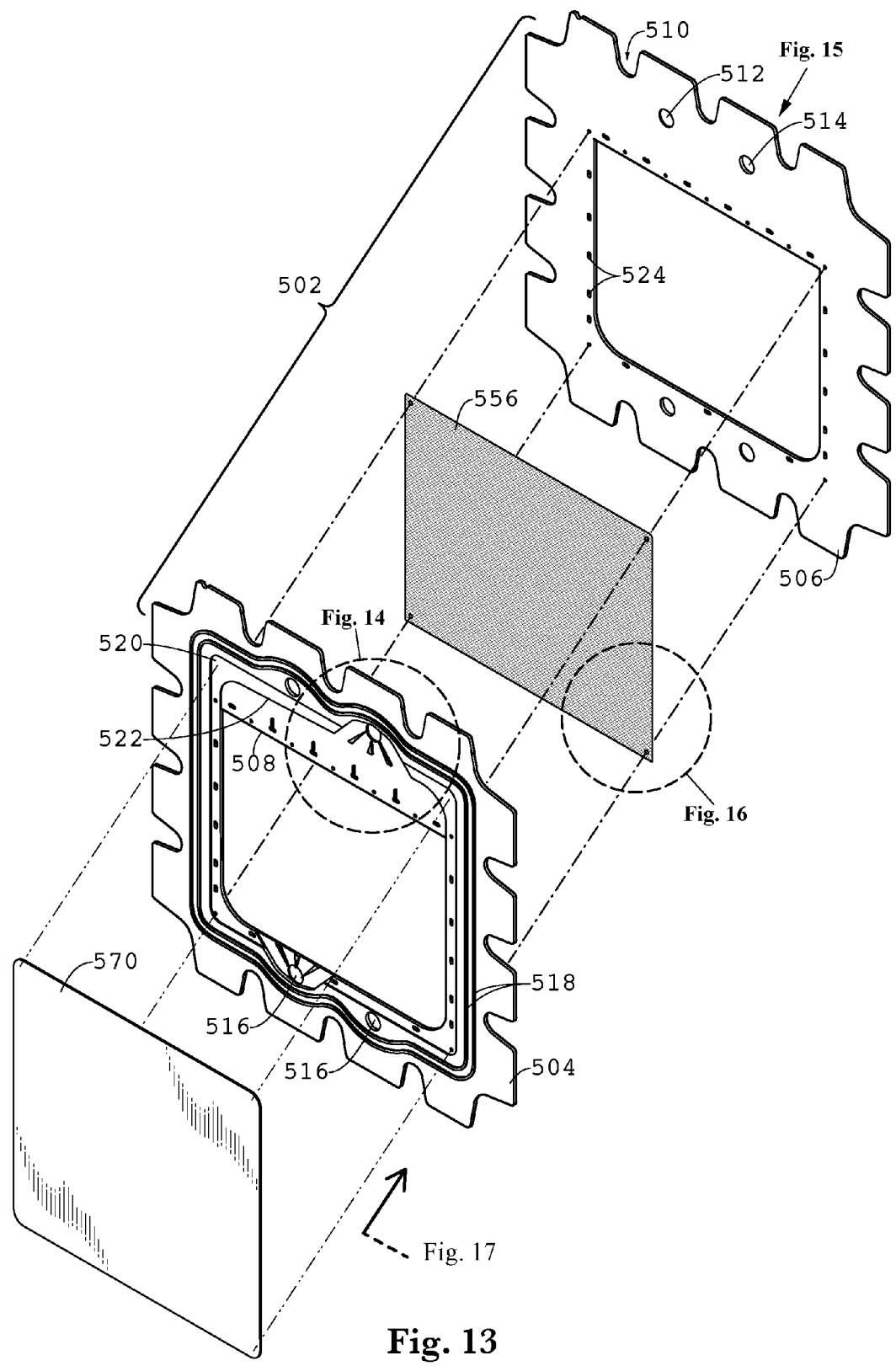
FIG. 13 is an exploded view of a membrane module and including an electrode.

In a further exemplary embodiment shown in FIG. 13, a membrane module 502 may also be provided and used in a multi-cell electrolyzer 102 (FIG. 3). A membrane 556, is partially encased within, and suspended within, a frame comprising a first frame portion 504 and a second frame portion 506. Although shown as a first frame portion 504 and a second frame portion 506, as one of ordinary skill in the relevant art will recognize, and as shown and described, the frame of the membrane module 502 itself may be formed, by, for example injection molding, as an integral piece. The first frame portion 504 and the second frame portion 506 may comprise HDPE, polypropylene, or other suitable material. Also shown in FIG. 13, as an aid to understanding, is an electrode 570. When assembled, an electrode 570 is held between two membrane modules 502. The electrode 570 is sized to nest in the first frame portion 504 on an electrode ledge 520. (Also seen in FIGS. 14 and 15.)

The membrane module 502 may further include slots 510 to accommodate compression bolts (not shown, described herein above). The membrane module 502 also further includes water inlets 516 through which water is introduced, and gas discharge outlets 512 and 514. Regarding the gas discharge outlets 512 and 514, as will be understood by one of ordinary skill in the relevant art, when electrolyzing water, either hydrogen or oxygen will discharge from the outlets 512, 514 depending upon the applied polarity.

Figure 14:
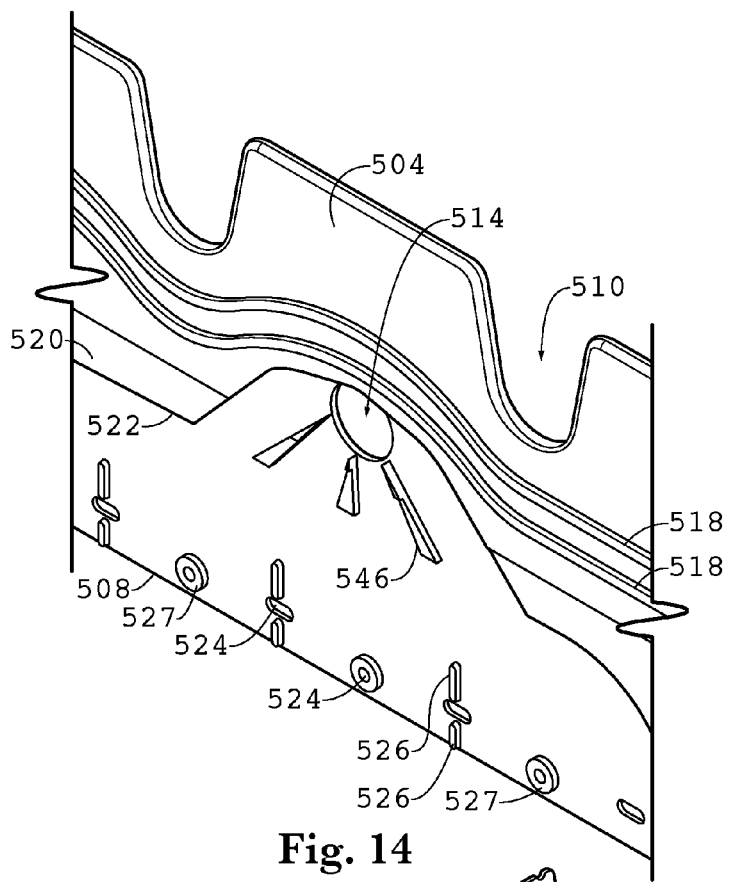
FIG. 14 is an enlarged view of the section noted as FIG. 14 in FIG. 13.
Figures 15, 16:
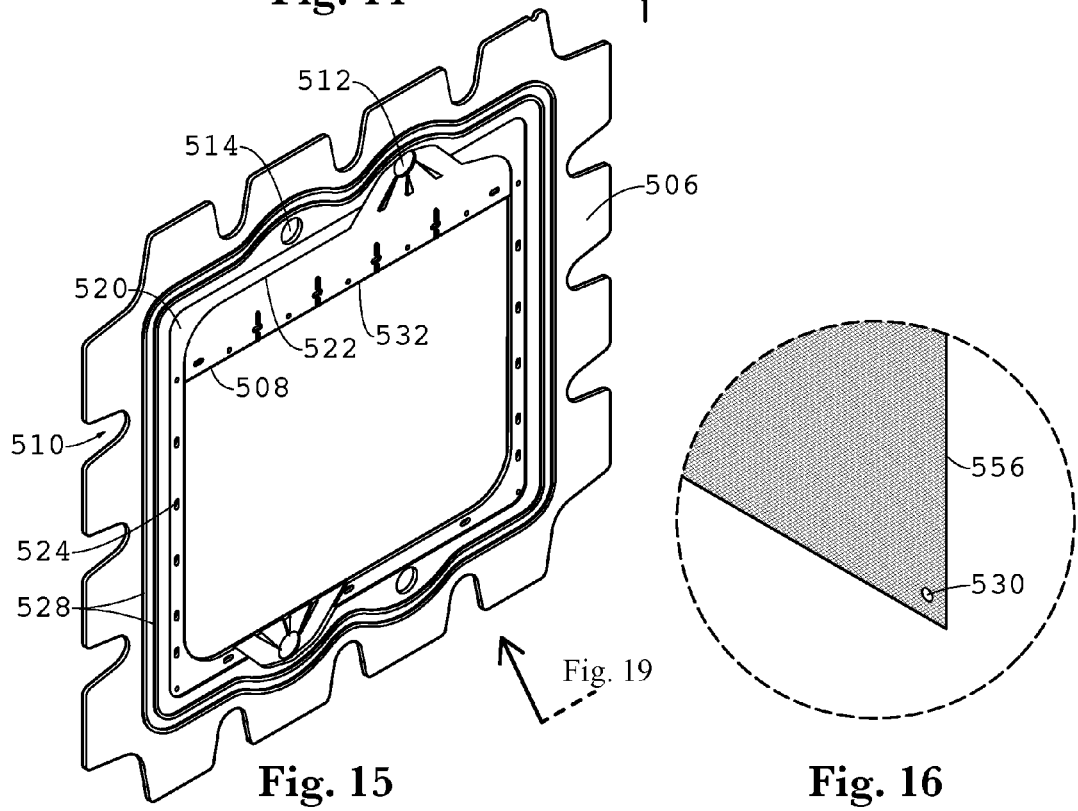
FIG. 15 is a view of the membrane module noted as FIG. 15 in FIG. 13.
FIG. 16 is an enlarged view of the section noted as FIG. 16 in FIG. 13.

The first frame portion 504 is formed to include at least one tongue 518 and the second frame portion 506 formed to include at least one groove 528. (FIGS. 13, 14 and 15.) Thus, when assembled, the at least one tongue 518 mates with an associated at least one groove 528 in an adjacent membrane module 502.

The membrane module 502 is also formed to include a curtain 508. (Also seen in FIGS. 14 and 15.) The curtain 508 provides stability to the membrane module 502 and facilitates separation of the evolved gases, for example, hydrogen and oxygen. The curtain 508 is further formed to include protrusions 526 and 527 which, along with portions of the channel supports 546, hold the electrode 570 in a spaced-apart position from the curtain 508, thereby enabling evolved gases to travel to the gas outlets 512 and 514. (Also seen in FIG. 14.) In addition, the curtain 508 may be thinner (e.g., 0.050 inches) at a curtain edge 532 (FIG. 15) and form a wedge therefrom of, for example, 15 degrees to, for example, 0.075 inches.

The membrane module 502 is formed to further include a gas slope 522. (Shown in FIG. 13, but best seen in FIG. 14, and especially FIG. 15.) The gas slope 522 inclines upward toward the gas outlet 512, for example, to facilitate passage of evolved gas to the gas outlet 512.

Figure 17:
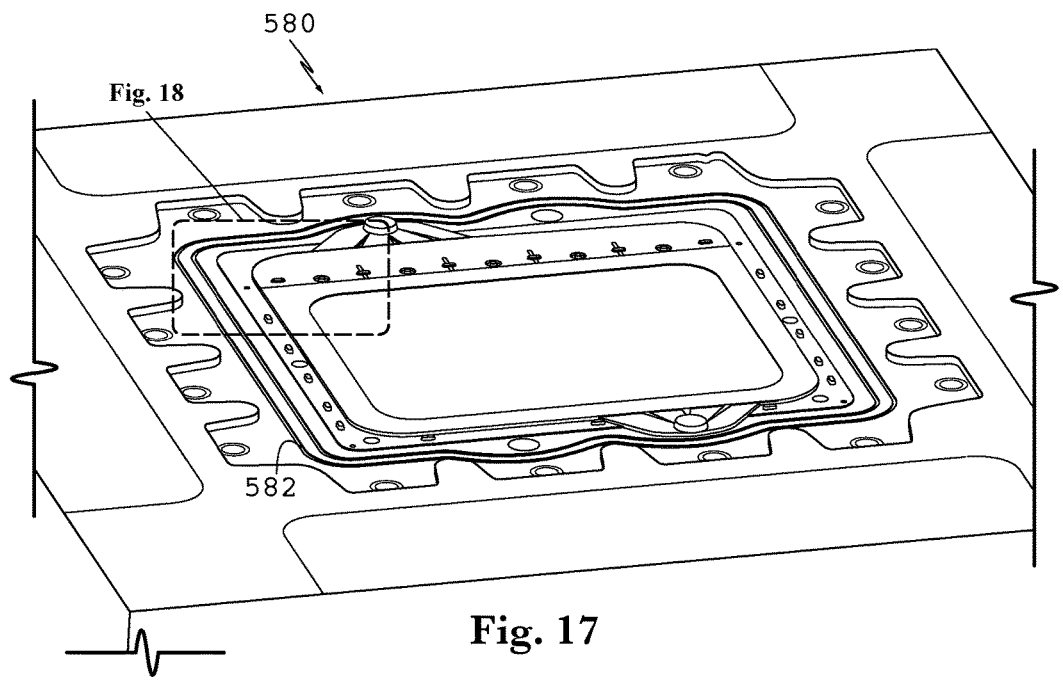
FIG. 17 illustrates the section of a mold used to form the portion of the membrane module noted as FIG. 17 in FIG. 13 of the membrane module of FIGS. 13-16.

Turning now to FIGS. 17-20, views of the mold designed to produce the membrane module 502 are shown. FIG. 17 shows a first portion mold section 580 which can be better understood by referring to the FIG. 17 indication of FIG. 13 which shows a face of the first frame portion 504. (See also, FIG. 14.) Thus, the first portion mold section 580 includes the at least one mold groove 582 which ultimately forms the at least one tongue 518 as seen in FIGS. 13 and 14.

Figure 18:
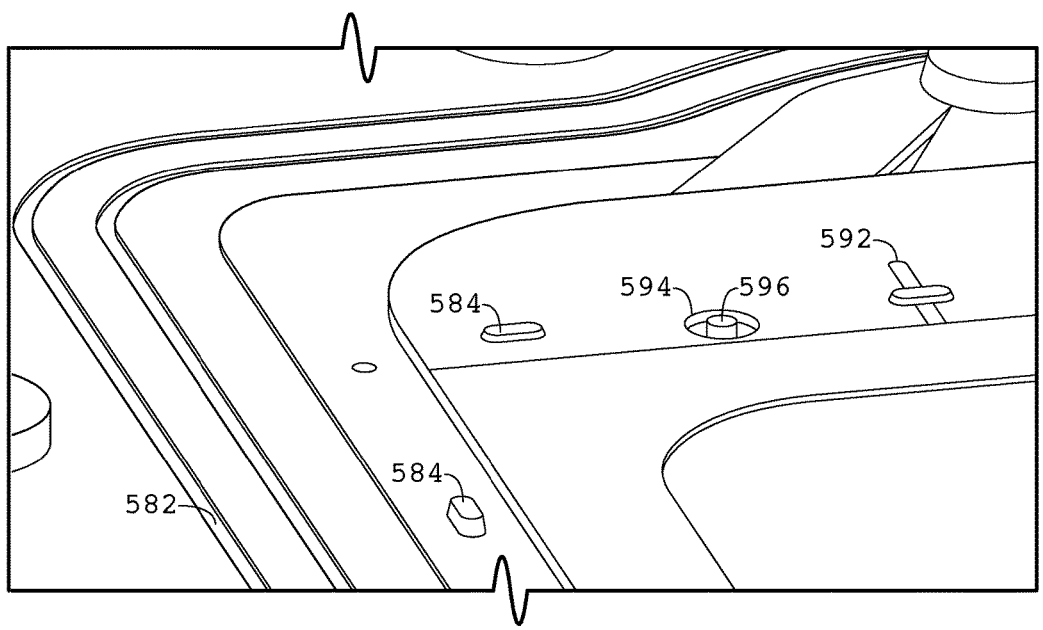
FIG. 18 is an enlarged view of the section noted as FIG. 18 in FIG. 17.

Turning now to FIG. 18, detail of the indicated portion FIG. 18 of FIG. 17 is shown. In addition to the at least one mold groove 582, FIG. 18 shows one of, exemplarily, at least one pinch hole protrusion 584, 596, and at least one curtain protrusion indent 592, 594 to produce the protrusions 527, 526 of the curtain (FIG. 14). A plurality of such protrusions 592, 594 are placed in the mold (FIG. 17).

Figure 19:
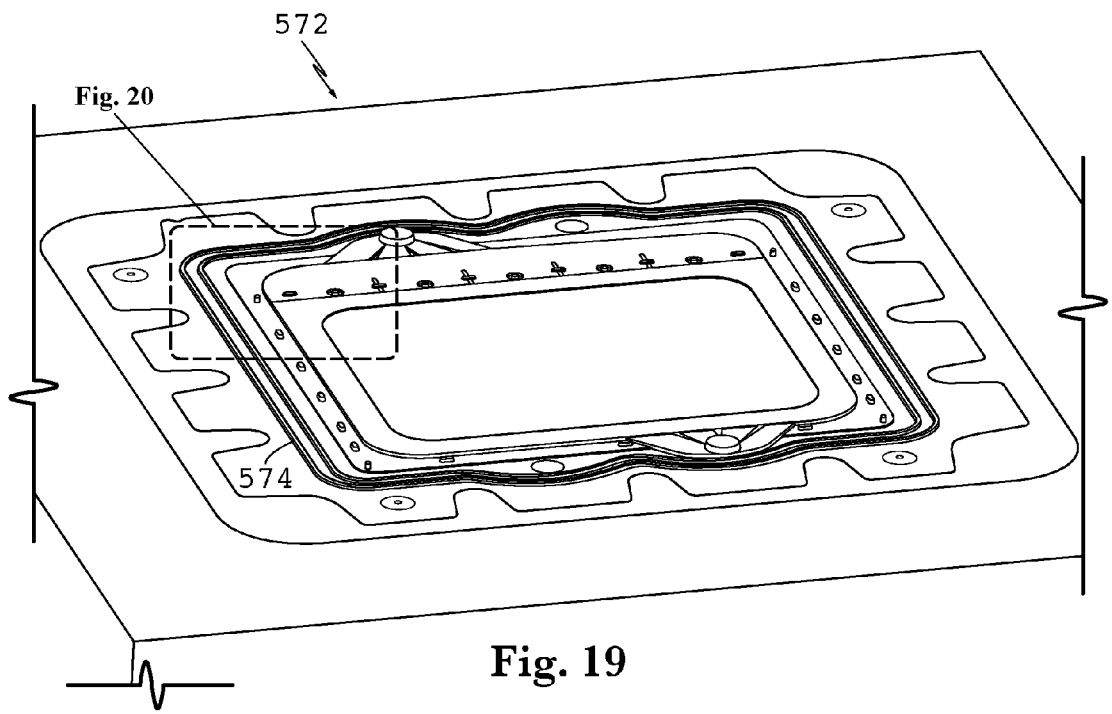
FIG. 19 illustrates the section of a mold used to form the portion of the membrane module noted as FIG. 19 in FIG. 15 of the membrane module of FIGS. 13-16.

Turning now to FIG. 19, a second portion mold section 572 is shown, which can be understood by referring to the FIG. 19 indication of FIG. 15 which shows a face of the second frame portion 506. Thus, the second portion mold section 572 includes the at least one mold tongue 574 which ultimately forms the at least one groove 528 as seen in FIG. 15.

Figure 20:
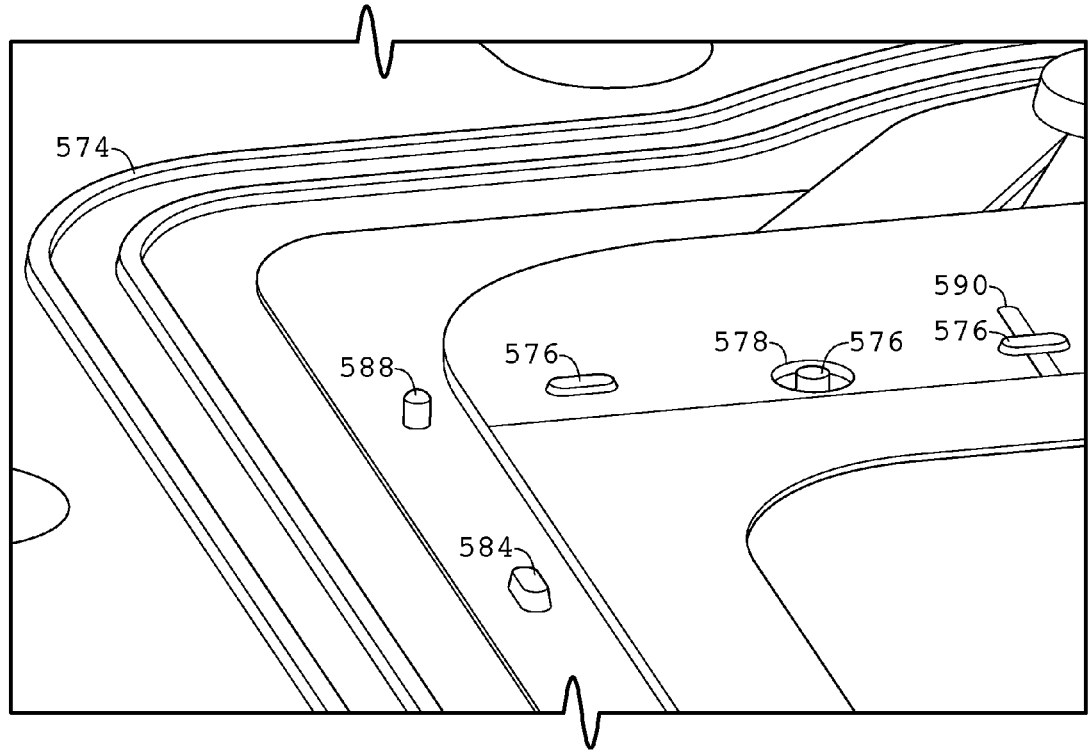
FIG. 20 is an enlarged view of the section noted as FIG. 20 in FIG. 19.

Turning now to FIG. 20, detail of the indicated portion FIG. 20 of FIG. 19 is shown. In addition to the at least one mold tongue 574, FIG. 20 shows pinch hole protrusions 576, 584 and at least one curtain protrusion indent 578, 590. The at least one curtain protrusion indent 578, 590 produces the curtain protrusion (not shown, but analogous to curtain protrusions 526, 527 of FIG. 14). FIG. 20 also shows one of, exemplarily, four membrane hangers 588. The membrane hangers 588 are arranged generally at four interior corners in the second portion mold section 572. The membrane hangers 588 could, of course, be included in the first portion mold section 580. The membrane hangers 588 are situated and spaced to align with matching membrane hanger holes 530 in the membrane 556 (FIG. 16).

The membrane module 502 is produced using the first portion mold section 580 and the second portion mold section 572. The membrane 556 is hung off the membrane hangers 588 by the membrane hanger holes 530 and, thus the membrane 556 is suspended in the second portion mold section 572. When so suspended, the first portion mold section 580 is mated with the second portion mold section 572, thus the membrane 556 is suspended within the mold sections 580, 572. When the first portion mold section 580 and the second portion mold section 572 are so mated, and the membrane 556 suspended, the pinch hole protrusions 584, 576, 596 pinch the membrane 556 around the periphery of the membrane 556 to hold it in place during the injection process. The pinching action of the pinch hole protrusions 584, 576, 596 thus form the membrane pinch holes 524 shown, for example, in FIG. 14.

In an exemplary embodiment, interior frames 260 have a gross thickness at the borders of about 0.110 in. The thickness of the interior frame 260 along the edge of the electrode ledge is about 0.086 in. When torqued, the membrane assembly is about 0.005 in. This configuration results in an inter-electrode gap of about 0.177 in.

Figure 6:
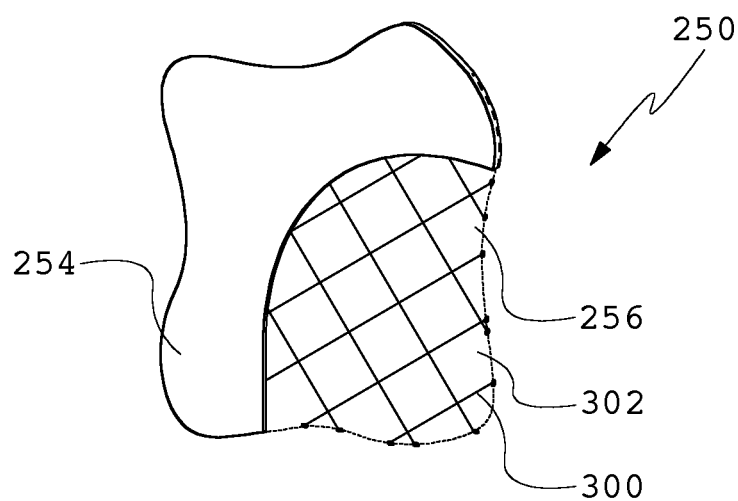
FIG. 6 illustrates the detail of a membrane fabric.

FIG. 6 illustrates the detail of the fabric of a ripstop nylon membrane 256. As shown, the membrane 256 includes a pattern of ribs 300 comprising interwoven ripstop reinforcement threads in a crosshatch pattern with fabric planes 302 therebetween.

FIG. 5 illustrates the detail of a channel 244 between an illustrative oxygen outlet 236 and an aperture 248. One or more channel supports 246 are shown which help keep the channel 244 from collapsing under the compressive load. Also shown in FIG. 5 is the electrode ledge 272 for providing fit and sealing to the interior electrode 270 (FIG. 4).

Figure 7:
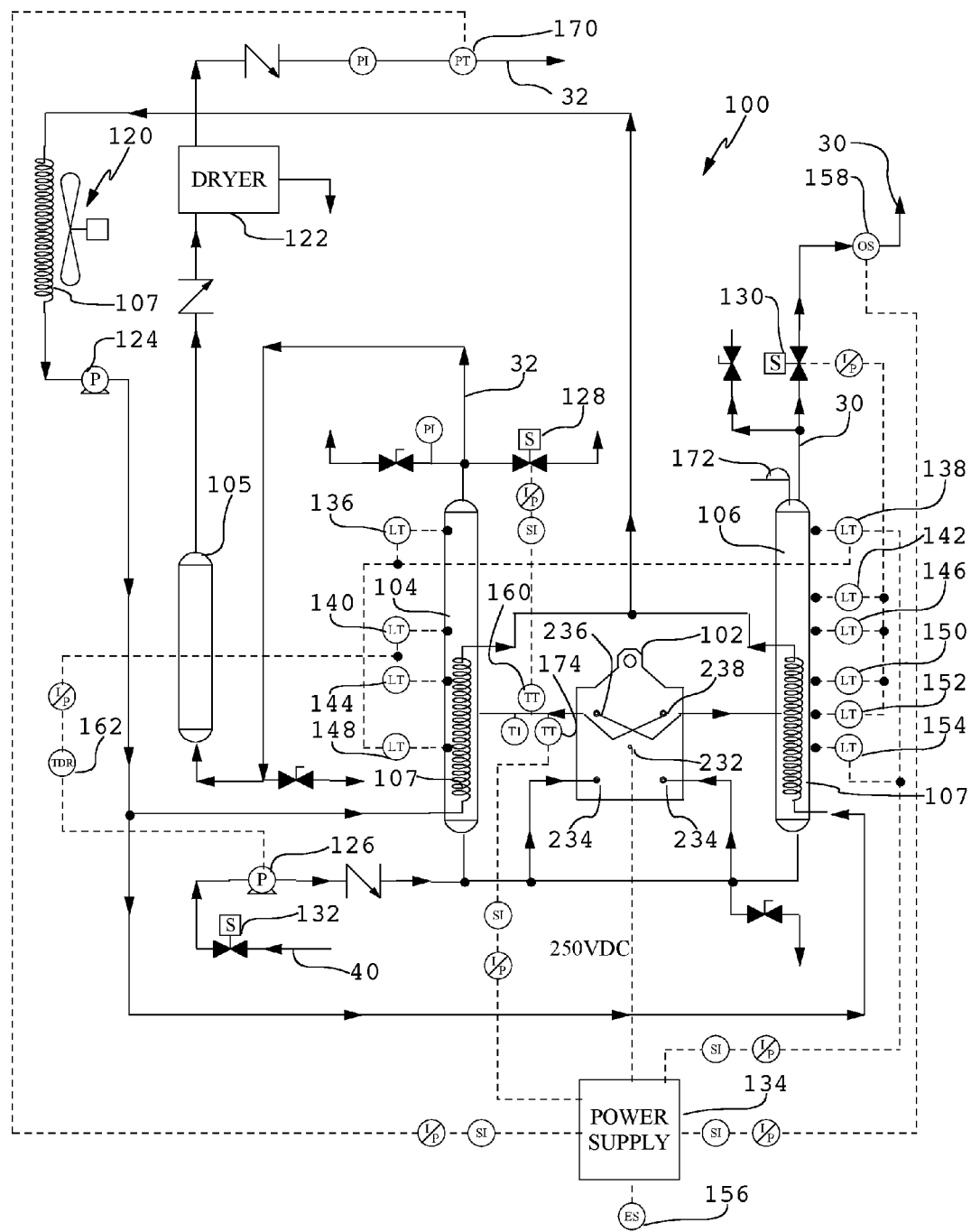
FIG. 7 is a process diagram illustrating an electrolyzer and associated ancillary equipment and controls.

Turning now to FIG. 7, shown generally is the electrolyzer process 100, the electrolyzer 102 is shown, along with the hydrogen collector 104, the oxygen collector 106, and a hydrogen expansion tank 105. Feedwater 40, which is formed from the water supply 34 and the electrolyte supply 36, is drawn from the feedwater tank 38 (FIG. 1). Feedwater 40 is supplied by a pump 126 and managed by a solenoid valve 132 which are described more fully herein below. As can be seen in FIG. 7, feedwater 40 may be balanced throughout the electrolyzer process 100 and provides feedwater 40 in the electrolyzer 102, the hydrogen collector 104, and the oxygen collector 106. The feedwater 40 enters the electrolyzer 102 through the one or more water inlet 234, shown illustratively in FIG. 7 as two water inlets 234. Feedwater 40 also provides a controlled liquid level in the hydrogen collector 104 and the oxygen collector 106, the control of which is described more fully herein below. An electrical supply 156 and power supply 134 are also provided and shown in FIG. 7. In the illustrated embodiment, 250 VDC power is supplied to the cathode 231 (not shown) and to the anode 230 (not shown) through the electrical studs 232. During operation, hydrogen 32 and oxygen 30 are withdrawn from the electrolyzer 102 through the hydrogen outlet 238 and oxygen outlet 236, respectively.

The hydrogen collector 104 may include appropriate liquid level sensors and transmitters. Four such instruments are shown in FIG. 7. A water level high transmitter 136 indicates when the water level in the hydrogen collector 104 is high. A water level low transmitter 148 indicates when the water level in the hydrogen collector 104 is low. A pair of water level transmitters 140, 144 initiate turning off and on, respectively, the feedwater pump 126. As will be appreciated by those skilled in the art, the functions of these multiple level transmitters may be provided by as few as one sophisticated level transmitter. At the outlet of the hydrogen collector 104 is a hydrogen relief valve 128.

The illustrative embodiment shown in FIG. 7 further includes a hydrogen expansion tank 105 downstream of the hydrogen collector 104. In an exemplary embodiment, the hydrogen expansion tank 105 helps stabilize the levels of water in the hydrogen collector 104 and the oxygen collector 106 when starting up with pressure preexisting in the hydrogen storage 12 (FIG. 1). A hydrogen expansion tank 105 having a volume of about 0.58 times the oxygen collector 106 should accomplish feedwater level stability long enough for the pressure in the electrolyzer process 100 to rise above the pressure in the hydrogen storage 12 (FIG. 1) and allow hydrogen to flow from the hydrogen collector 104 to the hydrogen storage 12 (FIG. 1). Lacking this feature, the feedwater level in the hydrogen collector 104 could drop enough to prematurely activate the feedwater pump 126 which could cause the electrolyzer process 100 to overfill with feedwater 40. In such case, as the electrolyzer process 100 becomes overfilled, as described above, when the system reaches pressure above that of the hydrogen storage 12, the water in the hydrogen collector 104 will reach the high water level fault indicator before the oxygen release valve 130 on the oxygen collector 106 is triggered by the level transmitter 150. Thus, unwanted or unnecessary shutdowns are avoided. Alternatively, the hydrogen collector 104 may be sized sufficiently larger than the oxygen collector 106.

Associated with the oxygen collector 106, and downstream thereof, is an oxygen sensor 158 (e.g., Bosch 13275). The oxygen sensor 158 is used to detect, by inference, hydrogen in the oxygen 30. Of course, a second oxygen sensor 158 could be used to detect oxygen in the hydrogen 32. Also included with the oxygen collector 106 may be a pressure relief valve 172.

The oxygen collector 106 may also include appropriate liquid level sensors and transmitters. Six such instruments are shown in FIG. 7. A water level high transmitter 138 indicates when the water level in the oxygen collector 106 is high. A water level low transmitter 154 indicates when the water level in the oxygen collector 106 is low. In addition, a series of sensors and transmitters control the discharge of oxygen 30 from the oxygen collector 106. In the illustrated embodiment, there are a pair of oxygen-off transmitters 142, 146 that effect the closing of an oxygen release control valve 130. In operation, when the water level in the oxygen collector 106 rises to either oxygen-off transmitter 142, 146, the oxygen release control valve 130 is closed and remains closed until the water level lowers to a point which activates either oxygen-on transmitter 150, 152 at which time the oxygen release control valve 130 is opened and remains open until the water level rises and actuates oxygen-off transmitter 142, 146 at which time the oxygen release control valve 130 is closed. During operation this cycle repeats to continuously balance the electrolyzer process 100 and remains active even if the electrolyzer process 100 is not active. As will be appreciated by those skilled in the relevant art, the functions of these multiple level transmitters may be provided by as few as one sophisticated level transmitter.

Further illustrated in the exemplary embodiment shown in FIG. 7 are one or more heat transfer coils 107 which can effectively utilize excess heat. Shown in FIG. 7 is a coil 107 within each collector 104, 106 and in combination with a fan 120. A pump 124 circulates a suitable heat transfer fluid (e.g., water) through the collectors 104, 106 and the heat sink 107 associated with the fan 120. The excess heat recovered from the collectors 104, 106 may be utilized, for example, in space heating or by placing a coil 107 downstream of the air handler of a forced air furnace.

Circuit Diagrams

Figure 8:
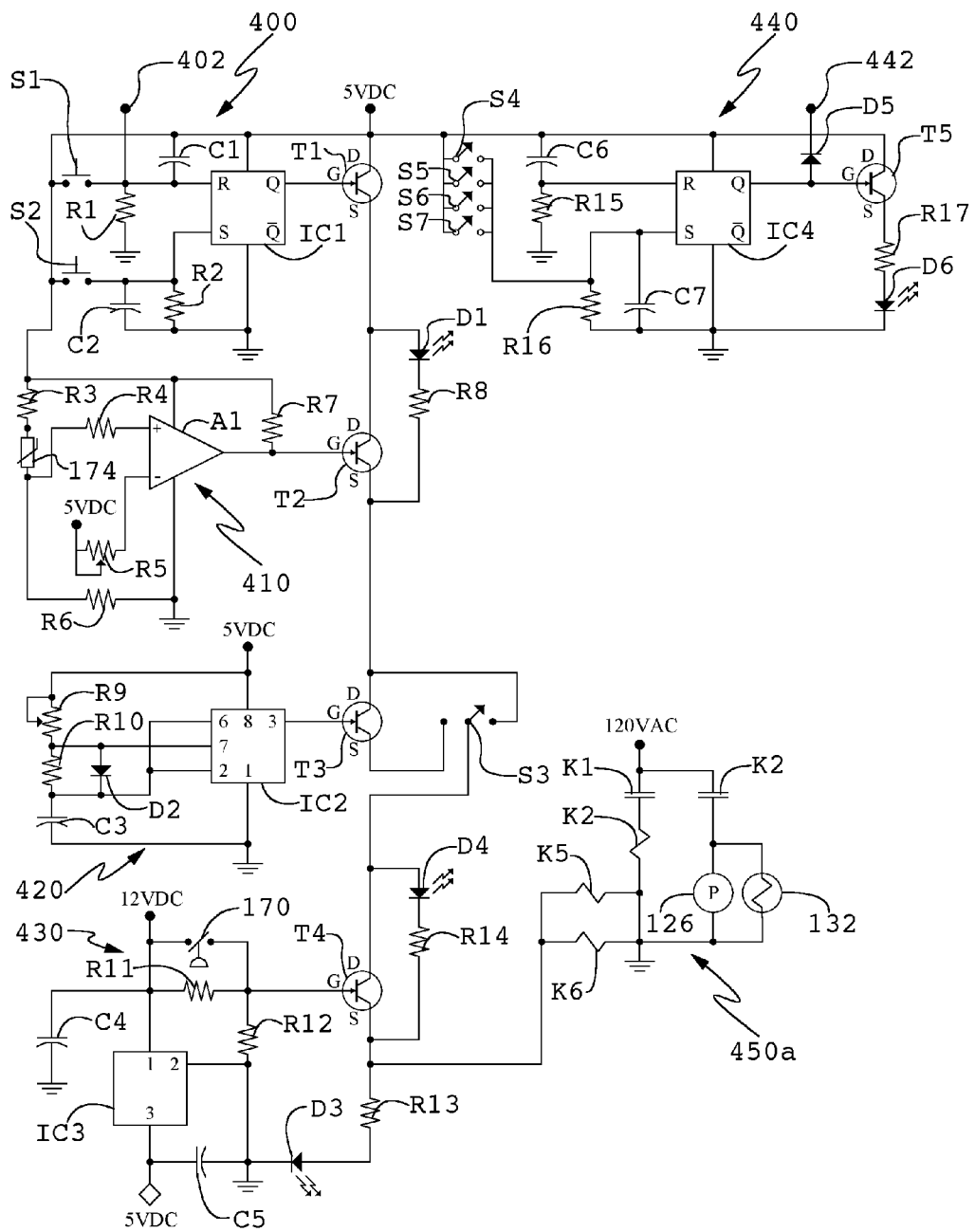

The following tables are intended to provide exemplary values for the electronic circuit elements shown in FIGS. 8-10 and described herein.

Resistors ($\Omega$)

| | | | |
|---|---|---|---|
| R1 = 100K | R2 = 100K | R3 = 10 | R4 = 47K |
| R5 = 100K | R6 = 100 | R7 = 22K | R8 = 470 |
| R9 = 100K | R10 = 100K | R11 = 470 | R12 = 470 |
| R13 = 100 | R14 = 100 | R15 = 100K | R16 = 100K |
| R17 = 470 | R18 = 47K | R19 = 100K | R20 = 470 |
| R21 = 22K | R22 = 100K | R23 = 100K | R24 = 470 |
| R25 = 47 | R26 = 100 | R27 = 100K | R28 = 47K |
| R29 = 22K | R30 = 470 | R31 = 10 meg | R32 = 100K |
| R33 = 100K | R34 = 0.001 | | |

Capacitors (µf)

| C1 = 0.001 | C2 = 0.001 | C3 = 100 | C4 = 100 |
|---|---|---|---|
| C5 = 0.1 | C6 = 0.001 | C7 = 0.001 | C8 = 0.001 |
| C9 = 0.001 | C10 = 4700 | C11 = 0.001 | C12 = 0.001 |
| C13 = 0.001 | | | |

Transistors (MOSFET)

| T1 = 2984 | T2 = 2984 | T3 = 2984 | T4 = 2984 | T5 = 2984 | T6 = 2984 |
|---|---|---|---|---|---|
| T7 = 2984 | T8 = 2984 | T9 = 2984 | T10 = 2984 | | |

Amplifiers

| A1 = NTE 943 | A2 = NTE 943 | A3 = NTE 943 |
|---|---|---|

Integrated Circuits

| IC1 = 4013 | IC2 = 555 | IC3 = 960 | IC4 = 4013 | IC5 = 960 |
|---|---|---|---|---|
| IC6 = 4013 | IC7 = 4013 | | | |

Diodes

| D1 = high temperature | D2 = 1N914 | D3 = power on | D4 = $H_2$ storage tank full |
|---|---|---|---|
| D5 = 1N914 | D6 = water level fault | D7 = high | D8 = H2 in $O_2$ fault |
| D9 = pump on | D10 = 1N914 | D11 = 1N914 | D12 = system warm |

Switches

| S1 = control system off | S2 = control system on | S3 = continuous or pulsed operation | S4 = 136-$H_2$ water high |
|---|---|---|---|
| S5 = 138-$O_2$ water high | S6 = 148-$H_2$ water low | S7 = 154-$O_2$ water low | S8 = 142-$O_2$ release closed |
| S9 = 146-$O_2$ release closed | S10 = 150-$O_2$ release open | S11 = 152-$O_2$ release open | S12 = 140-feedwater pump off |
| S13 = 144-feedwater pump on | | | |

Contactors

| Coil K1 and contact K1-energizes coil K2 | Coil K2 and contact K2-time delay operates pump and water input solenoid | Coil K3 and contact K3-battery saver circuit | K4 = K4-over temperature redundancy |
|---|---|---|---|
| K5 = K5-solid state relay | K6 = K6-solid state relay | | |

Looking first at FIG. 8, a power logic circuit 400 controls the overall control scheme. Power logic circuit 400 cooperates with the water level fault circuit 440 to shut off power if the water level becomes unbalanced. For example, if either of switches S4-S7 are closed (see, also, FIG. 7), a fault condition is indicated at D6 and a fault condition goes from fault output 442 to fault input 402. The power logic circuit 440 also cooperates with the oxygen sensor circuit 460 (FIG. 10) to shut off power if an unsafe level of hydrogen arises in the oxygen (see, also, FIG. 7). For example, if the oxygen sensor 158 detects an unsafe level of hydrogen in the oxygen, a fault condition is indicated at D8 and a fault condition goes from fault output 462 to fault input 402.

An operational temperature circuit 410 monitors heat levels in the electrolyzer 102. A thermistor 174 (see, also, FIG. 7) actuates when an unsafe temperature level (e.g., 160 deg. F.) is reached. This condition is indicated by LED D1. This shuts off the power to the electrolyzer 102, which remains off until the temperature drops below the preset temperature level. Thus, the electrolyzer 102 turns on and off to keep the electrolyzer 102 within a safe temperature regime.

An intermittent/pulsed operation circuit 420 provides adjustable intermittent power through a switch S3 to the electrolyzer 102 to regulate heat and to improve efficiency. This circuit also enables varying modes of operation of the electrolyzer 102. For example, the circuit may be cycled on-and-off at intervals from about one second to about two minutes or greater. This allows the hydrogen and oxygen to clear the electrodes, thereby increasing the effective surface area of the electrode. In addition, such intermittent operation assists in controlling the heat of the hydrogen generation system. In addition, the intermittent/pulsed operation circuit can enable the hydrogen system 10 to more effectively utilize power available from the wind turbine 24 (FIG. 1). An intermittent no-load condition of the wind turbine 24 allows it to gain inertia in low wind conditions. Then, when a load is applied, the kinetic energy of the spinning turbine 24 is applied to the electrolyzer 102.

A pressure switch circuit 430 controls the pressure in the hydrogen storage 12 (FIG. 1) via a pressure switch 170. As long as the pressure switch 170 is closed, indicating below preset maximum pressure in the hydrogen storage 12, MOFSET T4 conducts to coils K5 and K6 which are operably connected to contacts K5 and K6 (shown in the power supply circuit 490, FIG. 9, discussed below) and power remains on. When the pressure in the hydrogen storage 12 reaches the preset maximum pressure, power to the electrolyzer 102 is shut off. Normal operation is indicated at an LED D3 and a full pressure condition in the hydrogen storage 12 is indicated at an LED D4. When the pressure in the hydrogen storage 12 drops below a preset pressure condition, indicating there is room for more hydrogen in the hydrogen storage 12, power to the electrolyzer 102 is turned back on.

A water level fault circuit 440 monitors the water levels in the collection towers 104, 106 and shuts off power if the water level becomes unbalanced. The water level fault circuit 440 cooperates with the power logic circuit 400 discussed above.

Associated with the pump control circuit 450a, shown in FIG. 8, is a pump control circuit 450b shown in FIG. 9. And, shown associated with the pump control circuit 450b are two switches, switch S12, which is operably connected to the water pump off level transmitter 140 on the hydrogen collector 104, and switch S13, which is operably connected to the water pump on level transmitter 144 on the hydrogen collector 104. In operation, when level transmitter 144 senses a need for feedwater 40, coil K1 is energized in the pump control circuit 450b (FIG. 9) which closes contact K1 in the pump control circuit 450a (FIG. 8). The closing of contact K1 energizes coil K2 of the pump control circuit 450a which closes contact K2 of the pump control circuit 450a, thus powering the feedwater pump 126 (FIGS. 7 and 8) and opening the feedwater solenoid valve 132 (FIG. 7). When the level transmitter 140 on the hydrogen collector 104 senses sufficient feedwater 40, coil K1 is de-energized and the feedwater pump 126 is turned off and the feedwater solenoid valve 132 is closed. Coil K2 de-energizes after a preset time and must be reset in order to be reactivated. This provides protection to the pump 126 in such case when the feedwater 40 has been turned off or is empty. It also helps prevent overfilling in the event water level transmitter 140 fails.

Turning now to FIG. 10, the oxygen sensor circuit 460 interprets the voltage levels of the oxygen sensor as it correlates to the proportion of hydrogen in the oxygen. The oxygen sensor circuit 460 cooperates with the power logic circuit 400 (FIG. 8). The oxygen sensor circuit 460 will shut down the electrolyzer process 102 if the level of hydrogen in the oxygen 30 reaches unsafe levels by energizing a fault output 462 which is fed into the fault input 402 of the power logic circuit 400. An indicator LED D8 is also illuminated.

A battery saver circuit 470 shown in FIG. 9 is designed to automatically disconnect a battery 476 from the control circuits, thus preventing complete discharge of the battery 476 in the event of an extended power failure. This disconnect will occur if a power interruption lasts longer than about eight hours. The battery saver circuit 470 automatically reconnects the battery 476 when power is restored. The eight hours of standby allows for cool down and release of pressure by the control circuits in case of a power failure. This helps prevent the control circuits from draining the battery 476 in the event of an extended power outage.

In operation, when AC power is present, the standby transformer 472 supplies power to the rectifier diode D10 which feeds IC5. The output of IC5 then charges capacitor C10 through blocking diode D11. When charge is sufficient, the logic level MOSFET T10 conducts and energizes coil K3. This connects the battery 476 to the control circuits and a 12 VDC power supply via a normally-open contact K3. If AC power is removed, or a power outage is experienced for e.g., eight hours or other preset time, the MOSFET T10 de-energizes K3 which effectively disconnects the battery 476.

A warm-up circuit 480 monitors the warm-up phase of the operation of the electrolyzer process 100 and regulates the pressure inside the electrolyzer 102. An LED D12 is illuminated when the electrolyzer process 100 reaches operational temperature. With further reference to FIG. 7, during the warm-up phase, a hydrogen relief valve 128 is opened to vent the hydrogen 32 being produced to prevent any pressure from developing until the electrolyzer 102 reaches a preset and adjustable temperature that causes the electrolyzer 102 to expand and tightens the seals to hold pressure. In the alternative, a flare system may be provided to burn hydrogen being vented. The hydrogen relief valve 128 is then closed and the hydrogen 32 is further processed, in, for example, a dryer 122 and sent to hydrogen storage 12 (FIG. 1). If power to the electrolyzer process 100 is shut down for a period of time that would be sufficient for the electrolyzer 102 to contract, the bypass valve 128 is reopened to relieve all pressure from the electrolyzer 102 to prevent damage.

A power supply circuit 490 controls the main power to the electrolyzer 102. In an exemplary embodiment, a rectifier 498 converts 240 VAC to 250 VDC using two NTE6036 diodes and two NTE6037 diodes. As a redundant backup to the high temperature circuit 410 which includes thermistor 174, a thermal fuse 496, set to 180 deg. F. or whatever reform temperature of the material used in the electrolyzer 102, for example HDPE, helps protect the electrolyzer 102 from a thermal overload. If the thermal fuse 496 is tripped, a coil K4 is de-energized and two contacts K4 are opened, shutting off power to the electrolyzer 102. In addition, de-energizing coils K5 and K6 opens contacts K5 and K6 to shut off power to the electrolyzer 102. This may be effected by such conditions as a water level fault 442, the off button S1, a high temperature condition, oxygen mix, the intermittent circuit 420, or the pressure switch 170. Also shown in FIG. 9 is a fan 499 to help cool the rectifier 498 and solid state relays K5 and K6.

Also shown in FIG. 9 is a water level balance circuit 500 which is operably connected to the electrolyzer process 100. Switches S8 and S9, associated with level transmitters 142 and 146, respectively, cause the oxygen release solenoid 130 (FIGS. 7 and 9) to be closed. Conversely, switches S10 and S11, associated with level transmitters 150 and 152, respectively, cause the oxygen release solenoid 130 to be open. Thus, the water level in the electrolyzer process 100 is balanced.

Test Results

Tests were performed on an electrolyzer having the following configuration:

| | | | |
|---|---|---|---|
| Number of Cells | 111 cells | Electrode Size | 11 × 11 inches |
| Inter-electrode Gap | 0.177 inches | Feedwater | 5 oz. NaOH per gal. distilled water |
| Nominal Voltage | 240 VAC (converted to DC with four 85-amp diodes in a bridge configuration) | | |

Test 1

| | | | |
|---|---|---|---|
| Time | 4.5 minutes | Average Voltage | 253.3 V |
| Average Amperage | 27.43 amps | KWH | 0.5211 KWH |
| H2 Produced | 4.32 scf | H2 Conversion | 0.0791 KWH/cu. ft. H2 |
| H2 KWH Equivalent | 0.34 KWH | Efficiency | 65.2 percent |

Test 2

| | | | |
|---|---|---|---|
| Time | 1 hour | Average Voltage | 240 V |
| Average Amperage | 35 amps | KWH | 8.4 KWH |
| H2 Produced | 66.84 scf | H2 Conversion | 0.0791 KWH/cu. ft. H2 |
| H2 KWH Equivalent | 5.28 KWH | Efficiency | 62.9 percent |

Test 3

| | | | |
|---|---|---|---|
| Time | 9 minutes | Average Voltage | 246.5 V |
| Average Amperage | 36.76 amps | KWH | 1.36 KWH |
| H2 Produced | 11.36 scf | H2 Conversion | 0.0791 KWH/cu. ft. H2 |
| H2 KWH Equivalent | 0.90 KWH | Efficiency | 66.1 percent |

While certain preferred embodiments of the present invention have been disclosed in detail, it is to be understood that various modifications may be adopted without departing from the spirit of the invention of scope of the following claims.

We claim:

1. A process of creating a manufacture, the manufacture comprising:
   a frame, the frame comprising:
      a frame outer edge, the frame outer edge comprising a frame outer edge top portion;
      a ledge, the ledge in a spaced-apart relation to the frame outer edge, the ledge comprising a ledge inner edge, the ledge inner edge comprising a ledge inner edge top portion, the ledge inner edge top portion defining a gas slope, the gas slope positioned and adapted to facilitate the upward passage of evolved gas;
      a wedge-shaped curtain, the curtain extending from the ledge inner edge top portion and extending away from the frame outer edge top portion, the curtain comprising:
         a curtain top portion, the curtain top portion beginning at the ledge inner edge top portion;
         a curtain lower edge, the curtain lower edge thinner than the curtain top portion; and at least one curtain protrusion, the at least one curtain protrusion proximate the curtain lower edge; and
      an aperture, the aperture defined by:
         the curtain lower edge; and
         a portion of the ledge not including the ledge inner edge top portion; and
   a membrane, the membrane suspended and secured within the aperture;
   the process comprising the steps of:
      (a) placing a membrane onto at least two of a plurality of membrane hangers of a first portion mold section, the first portion mold section further comprising at least one pinch hole protrusion;
      (b) mating the first portion mold section with a second portion mold section, thereby creating a mold cavity, the mold cavity formed to define the frame, the second mold portion section comprising at least one pinch hole protrusion in juxtaposition to the first mold portion at least one pinch hole protrusion, thereby securing the membrane between the first portion mold section at least one pinch hole protrusion and the second portion mold section at least one pinch hole protrusion; and
      (c) injecting a plastic into the mold cavity, whereby the manufacture is created.

2. A process, the process comprising the steps of:
   (a) placing a membrane onto at least two of a plurality of membrane hangers of a first portion mold section, the first portion mold section further comprising at least one pinch hole protrusion;
   (b) mating the first portion mold section with a second portion mold section, thereby creating a mold cavity, the second portion mold section comprising at least one pinch hole protrusion in juxtaposition to the first mold portion at least one pinch hole protrusion, thereby securing the membrane between the first mold portion at least one pinch hole protrusion and the second mold portion at least one pinch hole protrusion; and
   (c) injecting plastic into the mold cavity.

3. The process of claim 2, wherein at least one of the first portion mold section and the second portion mold section further includes at least one curtain protrusion indent, whereby at least one curtain protrusion is formed.

4. The process of claim 2, wherein the mold cavity is formed to define a gas slope, whereby a gas slope is formed.

5. The process of claim 2, wherein the mold cavity is formed to define a wedge-shaped curtain, whereby a wedge-shaped curtain is formed.

\* \* \* \* \*